United States Patent
Albeck et al.

[11] Patent Number: 6,167,151
[45] Date of Patent: Dec. 26, 2000

[54] APPARATUS AND METHOD FOR 3-DIMENSIONAL SURFACE GEOMETRY RECONSTRUCTION

[75] Inventors: Dan Albeck, Giv'at Shmuel; Meny Benady, Tel Aviv; Arie Rudich, Tel Aviv; Tamir Shalom, Tel Aviv; Amnon Shashua, Mevaseret Zion; Eyal Yosef, Rishon Lezion; Ilan Zelnik, Matan, all of Israel

[73] Assignee: CogniTens, Ltd., Ramat Hasharon, Israel

[21] Appl. No.: 08/989,047

[22] Filed: Dec. 11, 1997

[30] Foreign Application Priority Data

Dec. 15, 1996 [IL] Israel ........................................ 119831

[51] Int. Cl.[7] ..................................................... G06K 9/00
[52] U.S. Cl. ......................... 382/154; 345/419; 345/430; 382/108
[58] Field of Search .................................. 382/103, 108, 382/154, 282, 284, 294, 153; 345/419, 420, 425, 430; 348/412, 47–48, 580, 584; 356/2, 376

[56] References Cited

U.S. PATENT DOCUMENTS

| | | | |
|---|---|---|---|
| 4,842,411 | 6/1989 | Wood | 356/376 |
| 4,867,570 | 9/1989 | Sorimachi et al. | 356/376 |
| 5,377,011 | 12/1994 | Koch | 356/376 |
| 5,442,672 | 8/1995 | Bjorkholm et al. | 378/4 |
| 5,598,515 | 1/1997 | Shashua | 395/122 |
| 5,633,995 | 5/1997 | McClain | 395/119 |
| 5,821,943 | 10/1998 | Shashua | 345/427 |

*Primary Examiner*—Bhavesh Mehta
*Attorney, Agent, or Firm*—Richard A. Jordan

[57] ABSTRACT

A system for reconstructing the surface geometry of an object includes a three-view optic head, a mechanical manipulator, a local 3D surface geometry reconstruction unit and a surface geometry stitching unit. The three-view optic head is operative to generate at least three views of at least a portion of the object. The mechanical manipulator is operative to vary the relative orientation of the object and the optic head, at a precision less than the a predetermined degree of precision, from a first relative orientation in which a first portion of the object is visible to at least one second relative orientation in which a second portion of the object, which overlaps the first portion, is visible. The local 3D surface geometry reconstruction unit is operative to generate local reconstructions of the surface geometries of the first and second portions of the object, based on at least two of three views of the first and second portions generated by the optic head. The surface geometry stitching unit is operative to determine the relative locations of the first and second portions of the object.

19 Claims, 23 Drawing Sheets

——————— PATCH A IMAGES

·················· PATCH B IMAGES

APPARATUS AND METHOD FOR 3-DIMENSIONAL SURFACE GEOMETRY RECONSTRUCTION

FIELD OF THE INVENTION

The present invention relates to apparatus and methods for three-dimensional (hereinafter "3D") surface reconstruction.

BACKGROUND OF THE INVENTION

State of the art computational methods relevant to 3D surface reconstructions are described in the following articles:

"Trilinearity of three perspective views and its associated tensor", Shashua and Werman, ICCV (International Conference on Computer Vision) '95, June 1995;

"Relative affine structure: canonical model for 3D from 2D geometry and applications", Shashua and Navab, IEEE Transactions on PAMI, 18(9), September 1996; and "Algebraic functions for recognition", A. Shashua, IEEE Transactions on PAMI, 17(8), August 1995.

A survey of state of the art methods for non-contact measuring is Tatterson, K. G., "Laser measurement finds its markets", Photonics Spectra, October 1996.

The disclosures of all publications mentioned in the specification and of the publications cited therein and of Israeli Patent Application 113496 and U.S. patent applications Ser. No. 08/497,224, filed Jun. 30, 1995, now U.S. Pat. No. 5,821,943 (whose disclosure corresponds to International Publication No. WO 96/34365, published Oct. 31, 1996) and No. 08/787,345 filed Jan. 27, 1997 (whose disclosure corresponds to U.S. Pat. No. 5,598,515) are hereby incorporated by reference.

Speckle metrology and interferometry are known for various applications. In speckle metrology, speckles are generated on an object sought to be inspected or measured. The speckles thus generated on the object of interest are highly dependent on the angular relationship between each surface of the object of interest and a laser or other light source used to generated the speckles thereon. Speckle metrology methods are described in Speckle Metrology, Rajpal S. Sirohi (Ed.), Marcel Dekker, Inc., 1993.

SUMMARY OF THE INVENTION

The present invention seeks to provide a novel and highly efficient 3D surface geometry reconstruction system.

There is thus provided in accordance with a preferred embodiment of the present invention a 3D surface geometry reconstruction system for reconstructing the surface geometry of an object to a given degree of precision, the system including:

a three-view optic head operative to generate at least three views of at least a portion of the object;

a mechanical manipulator operative to vary the relative orientation of the object and the optic head, at a precision less than the given degree of precision, from a first relative orientation in which a first portion of the object is visible to at least one second relative orientation in which a second portion of the object, which overlaps the first portion, is visible;

a local 3D surface geometry reconstruction unit operative to reconstruct the surface geometry of the first and second portions of the object, based on at least two of three views of the first and second portions generated by the optic head; and a surface geometry stitching unit operative to determine the relative locations of the first and second portions of the objects.

In accordance with a preferred embodiment of the present invention, the mechanical manipulator includes an object manipulator operative to move the object.

Preferably, the mechanical manipulator includes an optic head manipulator operative to move the optic head.

In accordance with a preferred embodiment of the present invention, the three views generated by the optic head include two views on which 3D surface geometry reconstruction is based and a third view from which a tensor is computed which represents the internal orientation of each of the three views and the relative orientation of the three views.

Preferably, the object includes:

a first section of the object seen in one of the three views;

a second section of the object seen in another of the three views; and an overlap section of the object which is included in the first section and the second section; and wherein the 3D surface geometry reconstruction unit includes an overlap section analyzer operative to analyze texture of the overlap section.

In accordance with a preferred embodiment of the present invention, the surface geometry stitching unit includes an overlap texture analyzer operative to analyze texture of a section of the second portion which overlaps the first portion, thereby to determine the relative locations of the first and second portions.

The texture may include the surface texture of the object and or texture applied to the object by a texturing process.

Preferably, the texture does not vary as a result of variation in the relative orientation of the object and the optic head.

In accordance with a preferred embodiment of the present invention, the texturing process includes an optical process for superimposing a pattern onto the object. Preferably, the optical process includes projecting a speckle pattern onto the object.

Preferably, the texture is projected onto the object.

In accordance with a preferred embodiment of the invention, the texture is a speckle pattern projected onto the object.

Preferably, the system includes a plurality of speckle generators each projecting a random speckle pattern onto the object.

Each speckle generator preferably comprises a diffuser on which a speckle pattern is generated and through which light is projected to project the speckle pattern from the diffuser onto a portion of the object.

Preferably, each speckle generator includes a laser diode which directs laser light via a lens onto said diffuser.

In accordance with a preferred embodiment of the invention, the diffuser is a holographic diffuser.

There is additionally provided in accordance with a preferred embodiment of the present invention a three dimensional imaging system comprising:

an imaging head;

positioning apparatus for varying the relative position between an object to be imaged and the imaging head;

at least one speckle generator projecting a speckle pattern onto the object, which speckle pattern is fixed with respect to the object and is invariant with the angle from which it is viewed by the imaging head; and an image combiner for combining multiple images of the object as seen by the imaging head at different relative positions with respect thereto, by matching portions of the speckle pattern on various ones of the multiple images.

There is also provided in accordance with a preferred embodiment of the present invention a 3D surface geometry reconstruction system for reconstructing the surface geometry of an object, the system including:

an optical head; and a mechanical manipulator operative to vary the relative orientation of the object and the optic head with at least five degrees of freedom and including:

an object manipulator operative to move the object; and an optic head manipulator operative to move the optic head;

a 3D surface geometry reconstruction unit operative to reconstruct the surface geometry of the object by analyzing images of at least portions of the object generated by the optic head.

Preferably, the mechanical manipulator provides a plurality of relative orientations of the object and the optical head such that the entire surface of the object is imaged by the optical head and wherein the surface geometry stitching unit is operative to reconstruct the entire surface of the object.

There is additionally provided in accordance with a preferred embodiment of the present invention a 3D surface geometry reconstruction system for reconstructing the surface geometry of an object, the system including:

a surface location computation unit operative to compute a multiplicity of locations falling on the surface of the object;

There is additionally provided in accordance with a preferred embodiment of the present invention a 3D surface geometry reconstruction method for reconstructing the 3D surface geometry of an object, the method including:

manually varying the relative orientation of the object and an optic head and generating a plurality of images of at least portions of the object for a corresponding plurality of relative optical head/object orientations; and reconstructing the 3D surface geometry of the object by analyzing the plurality of images.

A particular advantage of a preferred embodiment of the system shown and described herein is that the system can accurately reconstruct the 3D surface geometry of an object, without precise mechanical elements which, in conventional systems, are used to provide high precision scanning motion over the object's surface. The system is particularly suited for reconstruction of objects whose size and/or shape is such that only a portion thereof can be captured by a stationary imaging device, Another advantage of a preferred embodiment of the system shown and described herein is that entirely automatic surface reconstruction may be provided without any human intervention whatever.

Another advantage of a preferred embodiment of the system shown and described herein is that a particularly high density of reconstructed surface points is provided.

The robot of the present invention preferably has 6 degrees of freedom, including a vertical degree of freedom for manipulating the object and a vertical degree of freedom for manipulating the optic head. Alternatively, only one of these vertical degrees of freedom may be provided.

BRIEF DESCRIPTION OF THE DRAWINGS

The present invention will be understood and appreciated from the following detailed description, taken in conjunction with the drawings in which.

DETAILED DESCRIPTION OF AN ILLUSTRATIVE EMBODIMENT

The present invention provides a three dimensional surface geometry reconstruction system which is operative for reconstructing the surface geometry of an object. It is a particular feature of the system of the present invention that it can accurately reconstruct the 3D surface geometry of an object, without precise mechanical elements which, in conventional systems, are used to provide high precision scanning motion over the object's surface. The system is particularly suited for reconstruction of objects whose size and/or shape is such that only a portion thereof can be captured by a stationary imaging device. Another advantage of the system shown and described herein is that entirely automatic surface reconstruction may be provided without any human intervention whatever.

Figure 1:
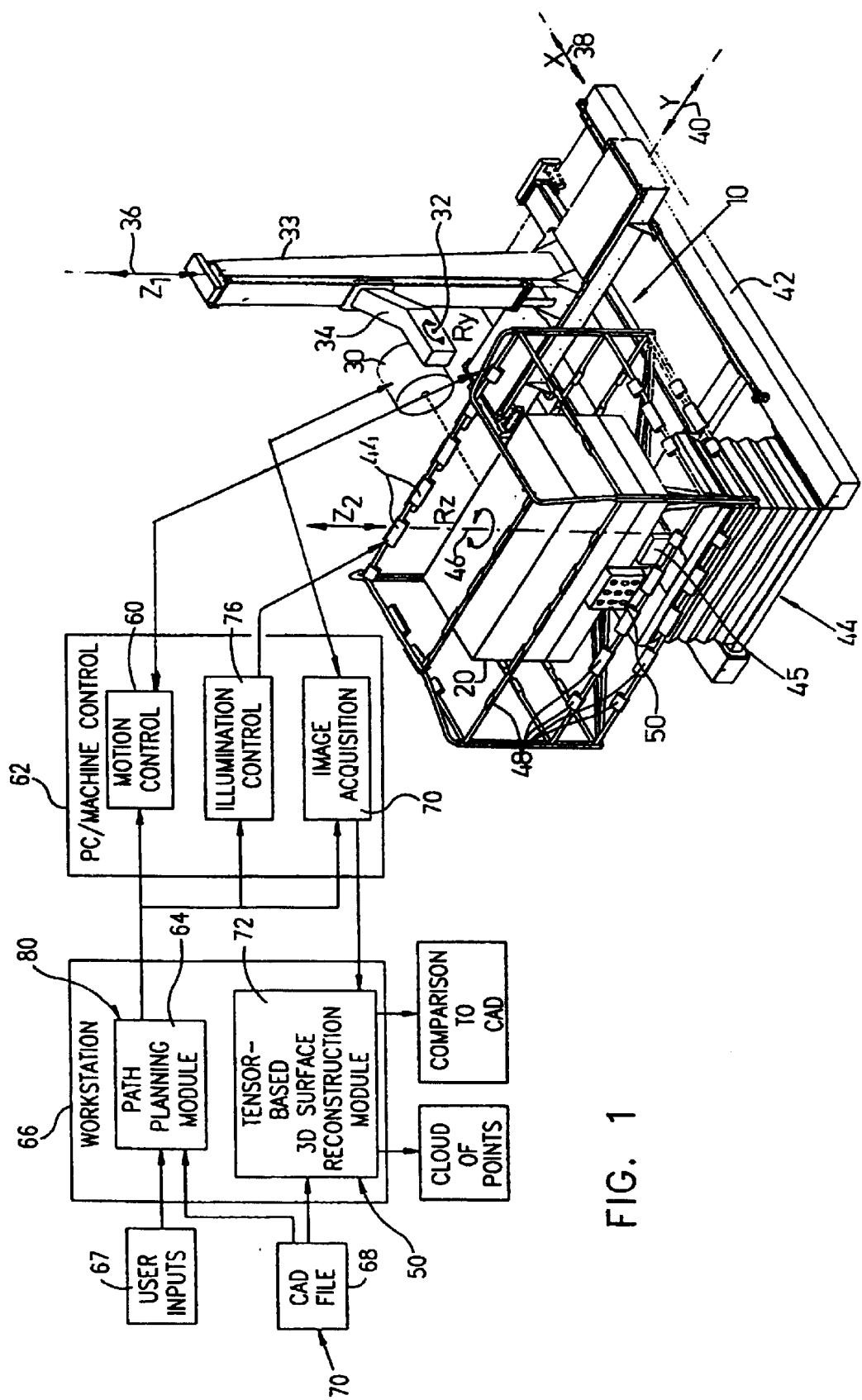
FIG. 1 is a simplified semi-pictorial semi-block diagram illustration of a 3D surface imaging and reconstruction system constructed and operative in accordance with a preferred embodiment of the present invention.

Reference is made to FIG. 1, which is a simplified semi-pictorial semi-block diagram of a 3D surface imaging and reconstruction system constructed and operative in accordance with a preferred embodiment of the present invention.

In the system of FIG. 1, a positioning assembly 10 is operative to provide relative motion between a relatively large optically textured object of interest relative to an optic head 30 so as to allow overlapping portions of the object of interest and an optic head 30 so as to allow overlapping portions of the object of interest to be imaged in a predetermined sequence, each from at least two and preferably at least three different viewpoints. From each such overlapping portion, a portion of the object's surface is reconstructed and these reconstructed portions are preferably subsequently "stitched" into a unified reconstruction of the entire surface of the object or of whichever portions of the entire surface which were viewed or which are of interest. It is appreciated that a textured surface facilitates stitching of the individual reconstructed surface portions into a single reconstructed surface by providing "orientation clues" to the stitching process.

Positioning assembly 10 preferably provides a total of six degrees of freedom for relative positioning between the optic head 30 and the object of interest which is to be imaged thereby.

In accordance with a preferred embodiment of the present invention the optic head 30 is selectably rotatably positioned about an axis 32 onto a mounting arm 34 which is mounted onto a mast 33 and may be selectably raised and lowered on along a vertical axis 36 defined in the mast 33. The mast may be moved horizontally along respective mutually perpendicular X and Y axes 38 and 40 relative to a fixed base 42.

An object support assembly 44 is fixed with respect to base 42 and includes an object support 45 which positions an object of interest vertically along a vertical axis 46 and rotationally about axis 46.

Electric motors (not shown), or alternatively any other suitable positioning drives, are operative to position the optic head 30 and the object of interest relative to each other in the aforesaid six degrees of freedom.

In accordance with a preferred embodiment of the present invention, fixed to the object support 45 and disposed in close proximity thereto are a plurality of texture generators 48, which are operative to project a texture pattern onto the object of interest 20. It is a particular feature of the present invention that the textured pattern remains in precisely fixed relationship to the object of interest throughout imaging thereof by the optic head 30. A scaling object 50 may be employed to perform tensor-based scaling, as will be described hereinbelow:

It is a further particular feature of the present invention that in contrast to the prior art, unstructured light, rather than structured light is employed to create texture on an object to assist in detecting corresponding features in individual images.

Control of the relative positioning of the optic head 30 and the object of interest is provided by motion control apparatus 60 forming part of an acquisition control unit 62, typically embodied in a personal computer. The motion control apparatus receives an output from a path planning module 64 which is embodied in a workstation 66, such as a Silicon Graphics workstation. The path planning module 64 is responsive to user inputs via a suitable user interface 67 and alternatively or additionally to the output of a CAD file 68 which may be supplied to the workstation 66.

Operational inputs to the optic head 30 are provided by and image outputs from the optic head 30 are provided to image acquisition circuitry 70, which receives inputs from the path planning module 64 and provides outputs to a tensor-based 3D surface reconstruction module 72, embodied in workstation 66. Module 72 also receives inputs from CAD file 68 and provides a cloud of points representing the object of interest or the results of a comparison between the cloud of points and the CAD file 68.

Illumination control circuitry 76 also receives an input from path planning module 64 and provides outputs to texture generators 48.

In the present specification, the term "optical texture" is employed to refer to nonuniform optical properties of a surface. Optical texture may be generated by optical means such as by projecting an optical pattern onto a surface or alternatively may be due to surface properties such as surface roughness and/or changes in surface color.

Figure 2:
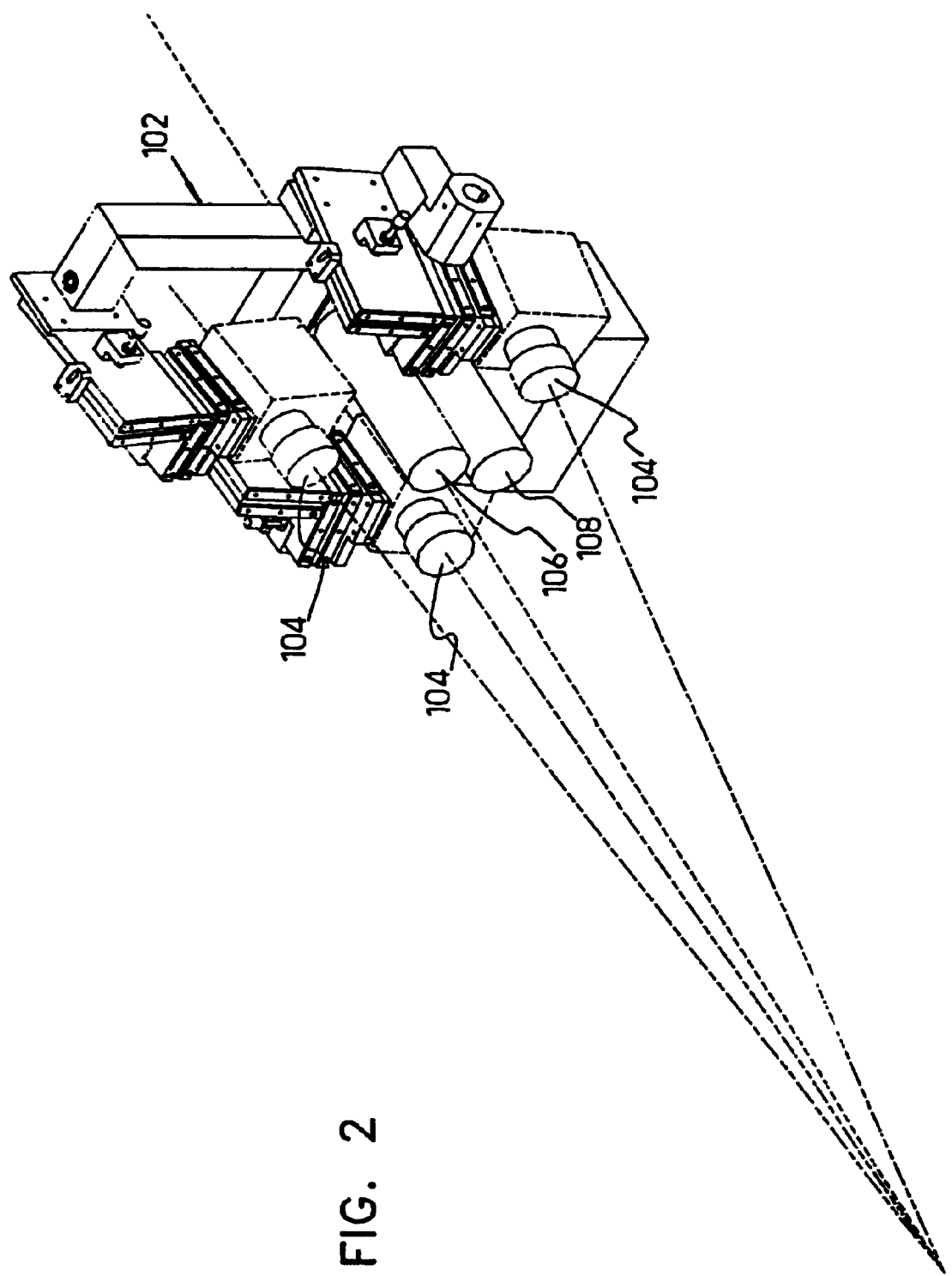
FIG. 2 is a simplified pictorial illustration of an optic head employed in the system of FIG. 1.

Reference is now made to FIG. 2 which illustrates a preferred embodiment of the optic head constructed and operative in accordance with a preferred embodiment of the present invention. The optic head comprises a chassis 102 on which are mounted a plurality of cameras 104, typically three in number, which are preferably all focused onto a common point. The cameras 104 may each be any suitable type of electronic camera, such as a CCD camera.

In accordance with a preferred embodiment of the invention, there is also mounted on chassis 102 a projector 106, for projecting auxiliary texture onto regions of an object of interest which is being viewed by the cameras 104. The projector is useful when it is desired to view regions of an object which, due to their configuration, lack the projected texture provided by texture generators 90.

There is also provided in accordance with a preferred embodiment of the present invention an illumination lamp 108. This lamp is not normally employed during automatic operation of the system wherein automatic "stitching" of images is performed using the texture generated by texture generators 90, but is useful for operation of the system in a manual path planning mode.

Figure 3:
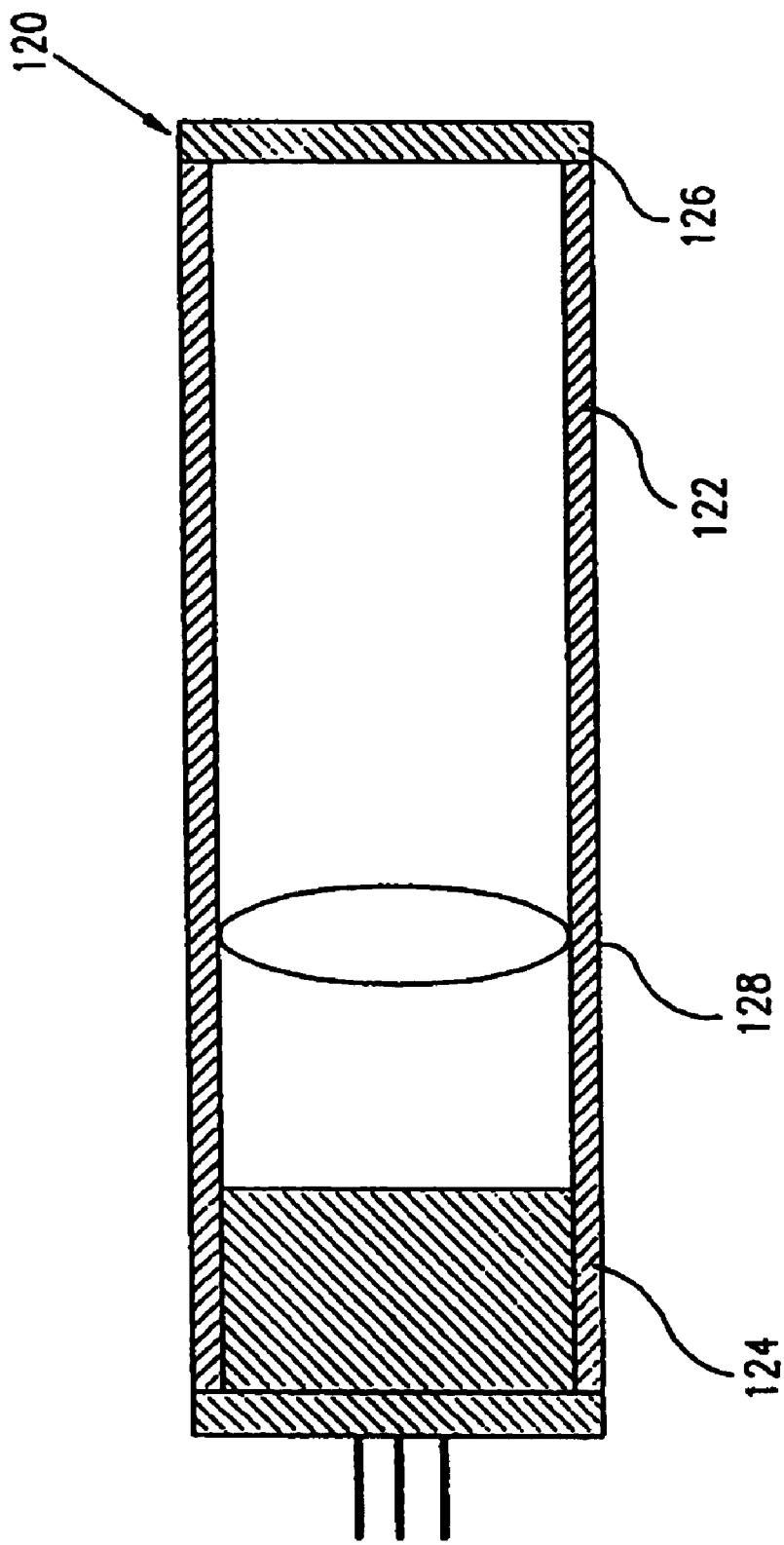
FIG. 3 is a simplified sectional illustration of an illumination module which forms part of a texture generator employed in the system of FIG. 1.

Reference is now made to FIG. 3, which is a simplified sectional illustration of an illumination module 120 which forms part of a texture generator employed in the system of FIG. 1. Typically, each texture generator 90 employs a plurality of illumination modules 120, which are each operative to project a fixed random texture pattern onto an object of interest.

It is to be noted that the texture generators 90 are fixed with respect to the object of interest, such that the location of the random texture pattern on the object of interest is fixed with respect thereto. Normally, certain regions of the object of interest may have projected thereonto texture patterns from more than one texture generators 90. This provides a wide illumination coverage angle, to better illuminate different surface orientations. In addition, due to the random nature of the texture pattern, this does not interfere with or influence the operation of the system of the present invention.

Each illumination module 120 typically comprises a mechanical mounting and housing 122 at one end of which is provided a single mode laser diode 124 and at an opposite end of which is provided a holographic diffuser 126. Disposed intermediate the laser diode 124 and the holographic diffuser 126 is a focusing lens 128. Impingement of the laser diode output on the holographic diffuser 126 causes the diffuser to produce speckles which are projected onto the object of interest, thus effectively "painting" that object with a random pattern. It is important that there be effectively no relative movement between the illumination module 120 and the object of interest during viewing of the object by the optic head 30, so that the random pattern can serve as a reference pattern on the object of interest, permitting "stitching" of separate images thereof together with high precision.

The average size of individual pattern spots projected onto the object of interest can be determined by the optical power and location of lens 128 relative to the laser diode 124 and the diffuser 126. The use of a holographic diffuser is preferred inasmuch as it provides control of the angularity of the projection and the intensity distribution thereof on the object of interest. It also enables the texture pattern to be made up of patterns of varying spatial frequencies.

As described below with reference to FIGS. 12A–12F, the use of pattern components of varying frequencies enables the "correspondence process" to proceed initially using low frequency patterns and to progress to higher accuracy using higher frequency patterns.

It is a particular feature of the invention that a speckle generating diffuser is employed. Such diffusers may be used at relatively short distances from the object of interest onto which the speckles are to be projected while providing a fine pattern and a large depth of field, as opposed to existing texture projection systems which are based on imaging techniques.

Preferably, the speckle generating diffuser is a two dimensional random diffraction grating. In accordance with a preferred embodiment of the invention, the diffuser is a holographic light shaping diffuser which provides a desired overall pattern configuration. For example, a holographic light shaping diffuser may be employed to provide a rectangular overall speckle pattern.

The use of speckles in this way is to be distinguished from prior art speckle metrology wherein a laser beam impinges directly on an object of interest causing speckles to be produced thereon. The prior art produces a speckle pattern which varies as a function of the angle from which it is used. The present invention requires that the speckle pattern be invariant to the angle from which it is viewed.

Figure 15:
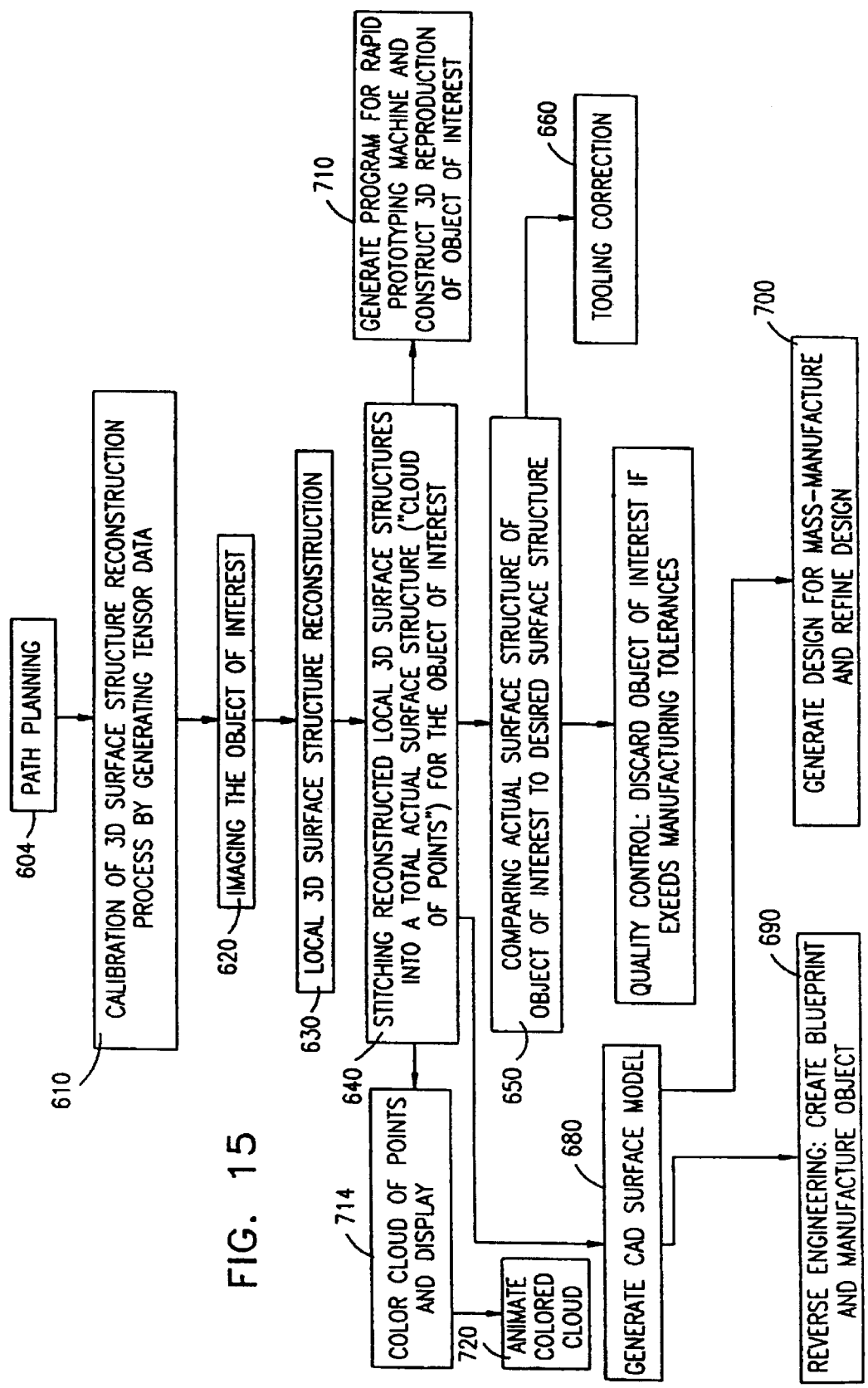
FIG. 15 is a simplified flowchart illustration of a preferred method of operation for the tensor-based 3D surface reconstruction module 50 of FIG. 1.

Reference is now made to FIG. 15 which describes a preferred method of operation for the tensor-based 3D surface reconstruction module 50 of FIG. 1. The method of FIG. 15 is operative to reconstruct the 3D surface structure of an object, in accordance with a preferred embodiment of the present invention, and includes the following stages:

Stage 604: Generating an imaging path along which the imager of the object is to advance. Typically, the order in which images are stitched is based on the imaging path.

Stage 610: Scaling for the 3D surface structure reconstruction process by generating tensor data Stage 620: Imaging the object of interest Stage 630: Local 3D surface structure reconstruction Stage 640: Stitching reconstructed local 3d surface structures into a total actual surface structure for the object of interest The total actual surface structure generated in stage 640 is useful in a broad variety of applications including but not limited to the applications of stages 650–720 which may be carried out either separately or in any combination. These applications are now described:

Stage 650: Comparing actual surface structure of object of interest to desired surface structure. Typically, the desired surface structure is defined by a CAD model and the comparison process is performed by aligning the actual and desired structures and then computing the distance between each reconstructed point and the CAD surface. This distance is also termed herein "the deviation of the reconstructed point".

Alternatively, the desired surface structure is defined by a "golden part" and the process of FIG. 15 is performed separately for the golden part and for the object of interest which is intended to resemble the golden part. The two resulting clouds of points are aligned and are then compared by performing the following steps on each individual point within one of the clouds:

a. Select a predetermined number of the points (typically 3–6 points) within the other cloud which are closest to the individual point.

b. Generate a geometric surface, such as a plane, which approximates those points.

c. Compute the distance of the individual point from the geometric surface. This distance is also termed herein "the deviation of the individual reconstructed point".

In applications in which visual inspection is used, each reconstructed point is preferably colored based on its deviation. For example, dark shades may signify points with large deviation whereas light shades may signify points with small deviation. Alternatively, different colors may be employed to signify different ranges of deviation.

Stage 650 is a precursor of applications such as tooling correction applications (stage 660) in which molds and/or other manufacturing tools are corrected based on actual production output, and quality control applications (stage 670).

Alternatively, stage 650 may be omitted e.g. if one of the applications of stages 680–720 is of interest.

Stage 680 generates a CAD model of the CAD surfaces of the object, based on the output of stitching stage 640. This process may be carried out using suitable commercially available tools such as Surfacer, marketed by ImageWare Corp., Ann Arbor, Mich.

This stage is a precursor of applications such as reverse engineering applications (stage 690) in which the CAD model is utilized to manufacture reproductions of the object which was reverse-engineered, e.g. by creating a blueprint and manufacturing therefrom. Another application is design refinement wherein, in the course of the design process, a physical model of the object, such as a clay model thereof, is created by a designer. A CAD model of the physical clay model is generated and analyzed and the results of the analysis are utilized to refine the design of the object.

The output of the stitching stage 640 may be used as input for a rapid prototyping procedure, using any suitable rapid prototyping machine such as the SLA-190 model manufactured by 3D Systems Inc., Valencia, Calif., U. S. A. Rapid prototyping is useful in a wide variety of fields such as for rapidly generating a prototype of a potential product and for the entertainment, tourism and souvenir industries, e.g. for generating novelties such as busts of customers.

In stage 714, the cloud of points generated by stage 640 is colored. The color assigned to each point within the cloud is the original color of the location corresponding to that point in the actual object of interest. Preferably, conventional surface interpolation is performed on the points in order to generate a continuous colored surface. A suitable surface interpolation technique is described in an MIT Press book by W. E. L. Grimson published in 1981–1982.

The resulting colored cloud may be displayed as a realistic 3D graphic model e.g. for insertion in multi-media applications, educational software, computerized catalogs and computer or video games. The colored cloud may be displayed using its natural texture or alternatively, may be modified to generate artificial effects such as a metallic texture. The colored cloud may be animated (step 720) for entertainment purposes such as 3D animated movies or special effects in conventional movies. Each of stages 604–640 is now described.

Stage 604: Path Planning

This stage is typically performed by path planning module 80 of FIG. 1. Path planning module 80 preferably generates the following three outputs:

Output 1: A set of "patches" corresponding to a portion of the object being measured. Each patch includes a triplet of overlapping images of said portions and a location from which the robot generated the image triplet.

Output 2: A plurality of sequences of patch pairs. The two patches in each pair except the first pair overlap in the sense that one, two or preferably all three of the corresponding images in the two image triplets overlap. The first pair of patches includes a destination patch on the left and a source patch on the right which is intended to be stitched to the destination patch via the other patches in the same sequence using a "stitching" operation.

Each patch in the set must appear as a source patch in at least one of the sequences.

Output 3: A plurality of sequences of patches characterized in that the stitching operation has already computed a transformation between each adjacent pair of patches. This generates a sequence of transformations. The last patch in the sequence may be transformed into the first patch of the sequence by computing a compound transformation of the sequence of transformations.

The path planning process performed by path planning module 80 comprises the following three steps:

Step 810—Tiling and generation of Output 1
Step 820—Create stitching graph
Step 830—Scan stitching graph and generate Outputs 1–3 which include the path itself.

Each of the above steps is now described.

Step 810—Tiling: The path planning module 80 preferably comprises an interactive software module which prompts the user to select overlapping portions of the object to be imaged, in order to create sequences of overlapping images which together cover the portion of the object that is to be measured. The user then connects the neighboring sequences s/he created such that all sequences created are connected at the end of this process. The robot viewing locations and their order of execution are defined in this step, which generates Output 1.

There are several possible methods of obtaining a list of pairs of images of overlapping adjacent object portions. If a CAD model 70 of the object to be inspected exists, then the path planning module 80, operating in "CAD model available" mode, is preferably operative to superimpose the path on the CAD model and to determine which pairs of images relate to objects portions which are adjacent and overlapping. Even if no CAD model 70 exists, the path planning module 80, operating in "CAD model unavailable" mode, preferably records the robot locations at which the object was imaged and therefore is able to determine which pairs of images relate to object portions which are adjacent and overlapping. If imaging is manual, the human operator preferably is operative to provide manual input as to which pairs of images relate to object portions which are adjacent and overlapping.

Step 820—Create stitching graph:

Create a graph, termed herein a "stitching graph", in which each node is a sequence of partially overlapping image triplets and in which a pair of nodes v and u of the graph are connected by an edge if at least one patch in v partially overlaps at least one patch in u.

Step 830—Scan stitching graph and generate Outputs 1–3 which include the path itself:

Systematically scan the stitching graph generated in step 820 to find yet-untreated (i.e. not yet stitched to a neighbor) sequences of images. Any suitable searching scheme may be used such as, preferably, a breadth-first search. The first image triplet ("patch") in the first yet-untreated sequence found is termed the "base". All patches of the sequence are stitched to the base. Each subsequent yet-untreated sequence found is stitched to a neighbor (i.e. a node connected to that sequence by an edge) that has already been treated. The output of this process includes:

A plurality of lines of Output 2, each describing the stitch between each patch in the sequence to the base, a single line of Output 2, which describes the stitch between the two sequences, if the above-described format for Output 2 is employed, and a single line of Output 3, if the above described format for Output 3 is employed. This line describes the computation of the transformation from the current sequence to the coordinate system of the base.

Figure 16:
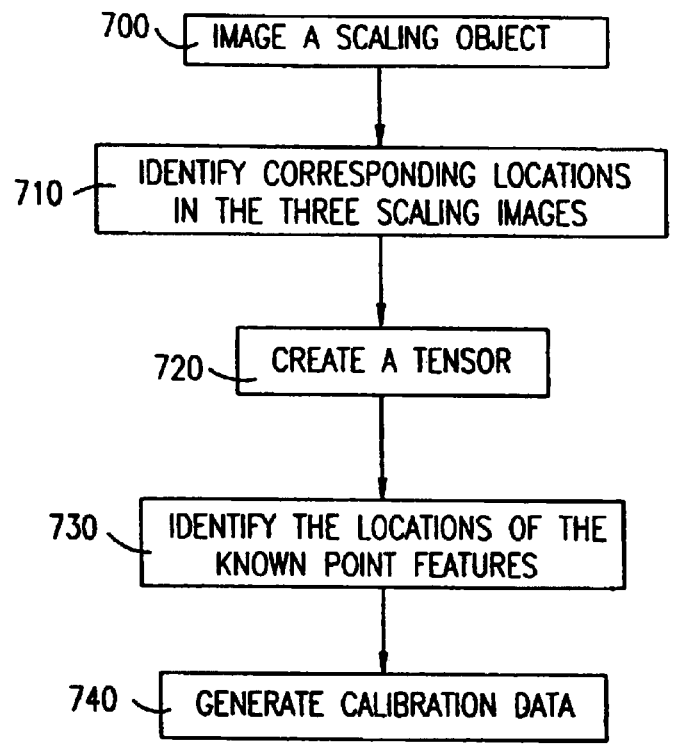
FIG. 16 is a simplified flowchart illustration of a preferred method for performing scaling for the 3D surface structure reconstruction module of FIG. 1.

Stage 610: Calibration of 3D Surface Structure Reconstruction Process by Generating Tensor Data Stage 610 includes the following steps, as shown in FIG. 16:

a: step 700: Image a scaling object—Generate a triplet of 2D images of a scaling object. The triplet includes 3 views of essentially the same portion of the scaling object. The scaling object is characterized in that it is textured and that it includes several (at least 5, typically) known point features. The term "known point features" refers to point features which are easily identifiable either manually or automatically, such as corners or circle centers, and which occur at known (x,y,z) locations. A preferred scaling object is illustrated in FIGS. 19–21.

Figure 19:
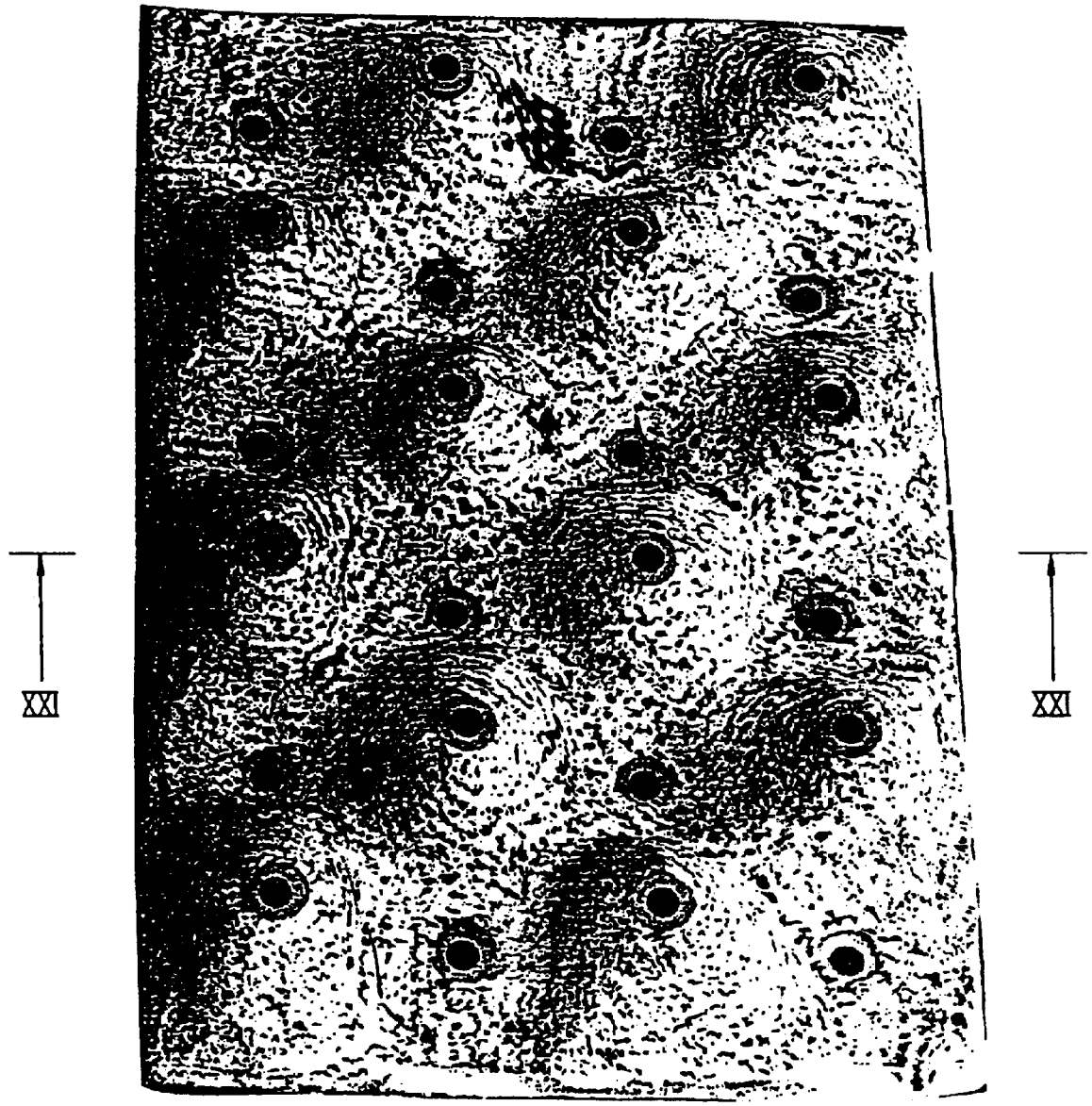
FIG. 19 is a photograph of a preferred scaling object.

Specifically, FIG. 19 is a photograph of a preferred scaling object. As shown, FIG. 19 includes a plurality of precisely manufactured holes at two different levels of elevation, namely a high level and a low level. Typically, the holes are arranged in a grid in which high and low level holes alternate in a "checkerboard" format. The surface of the scaling object includes a plurality of generally cone-shaped portions formed around each high level hole which reduce the level of elevation of the surface from the high level to the low level, typically reaching the low level just before the adjacent low level hole is encountered.

Figure 20:
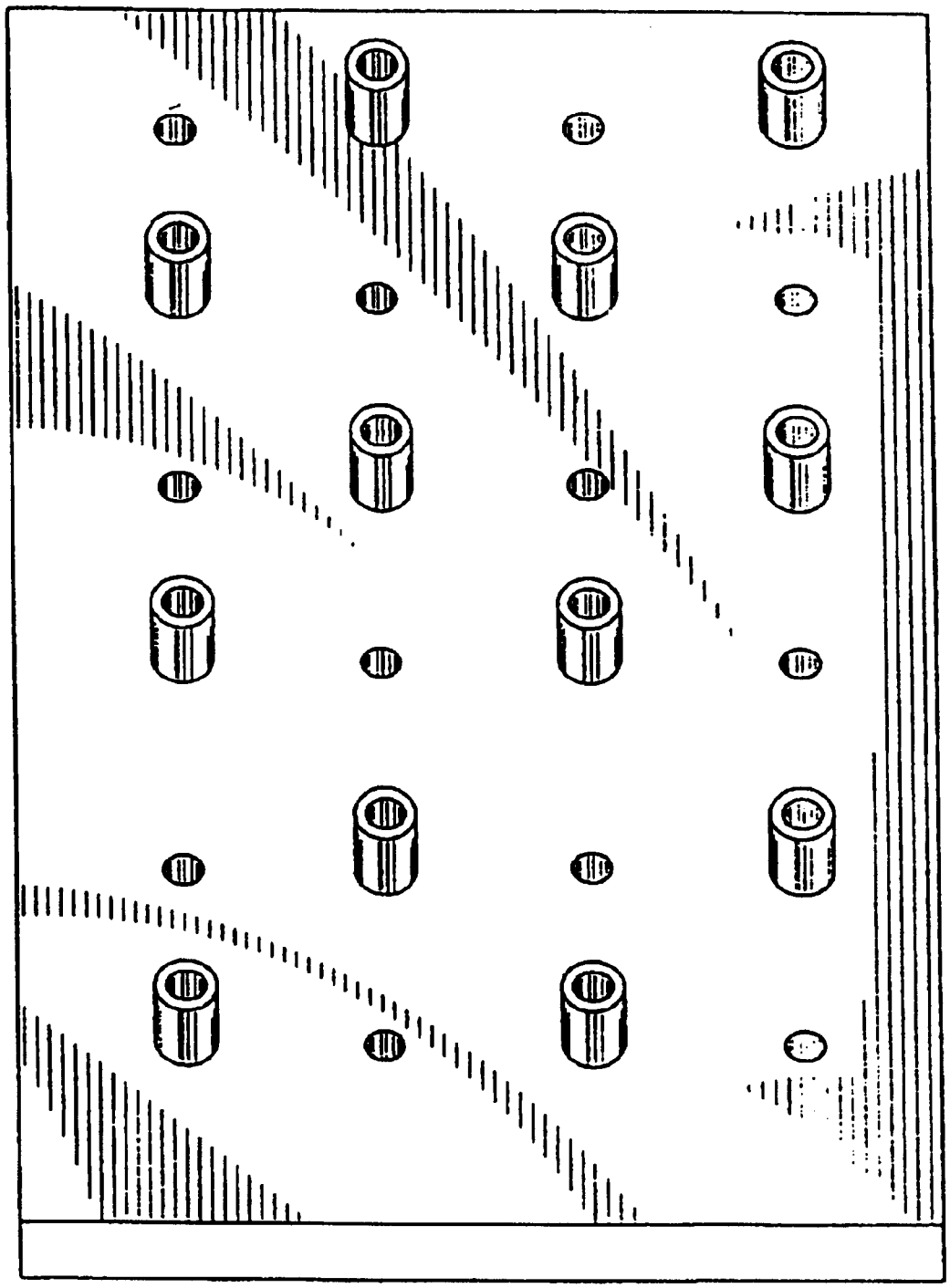
FIG. 20 is an isometric illustration of a precursor of the scaling object of FIG. 19.
Figure 21:
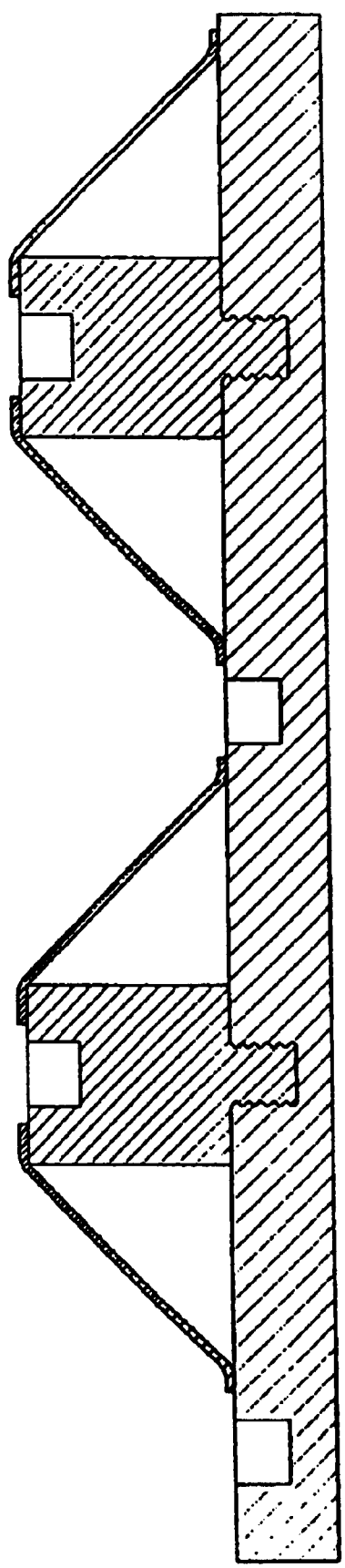
FIG. 21 is a cross-section taken along lines XXI—XXI of FIG. 20.

FIG. 20 is an isometric illustration of a precursor of the scaling object of FIG. 19 showing only the two levels of holes without the surface connecting them. FIG. 21 is a cross-section taken along lines XXI—XXI of FIG. 20.

b. Step 710: Find "corner" surface points in a first image within the image triplet, as described below with reference to step 760. For each "corner" surface point within the first image, identify corresponding locations in the remaining two scaling images. If the scaling object has a discontinuous surface, point feature detection is performed. Alternatively, the corresponding locations in the scaling object, whether continuous or not, may be identified manually. The output of step (b) is a set of triplets of corresponding locations, typically at least 7 such triplets. The corresponding locations are not necessarily the locations of the known point features.

c. Step 720: Use the output of step (b) to create a tensor. Preferred methods for creating a tensor from triplets of corresponding locations are described in copending U.S. patent application Ser. No. 08/497,224;

d. Step 730: Identify the locations of the known point features in each of the 3 views generated in step (a), thereby to generate several triplets of corresponding locations, typically at least five triplets of corresponding locations. Associate each triplet of 2D locations of a particular known point feature, with the known 3D location of that point feature.

The known 3D locations of the point features are externally supplied. Step (d) may even be performed manually.

The output of step (d) is at least five units of information regarding at least five known point features respectively, wherein each unit of information includes the 3D location of that point feature and the 2D locations of that point feature in each of the 3 scaling views generated in step (a).

Alternatively, two scaling objects may be used, one being textured and the other including several known point features. Steps (b) and (c) are performed on the first scaling object which is textured. Step (d) is performed on the second scaling object which includes several known point features. The first scaling object may, for example, be the object of interest itself. The second scaling object may have either a continuous surface or a discontinuous surface. A triplet of 2D images is generated for each of the two scaling objects, using the same fixed orientation between the triplet of cameras.

e: step 740: Use the output of step (d) and the tensor generated in step (c) in order to generate scaling data, also termed herein "tensor data" because part of the scaling data is typically an identification of the tensor computed in step (c). Preferred methods for performing step 740 are described in copending U.S. patent applications Ser. Nos. 08/497,224 and 08/787,345 and U.S. Pat. No. 5,598,515. Tensor data preferably includes, apart from the tensor itself, a transformation from projective coordinates to Euclidean coordinates, the fundamental matrix and the epipole.

Stage 620: Imaging the Object of Interest

Stage 620 includes the following step f:

f. Step 750: Imaging the object of interest—Generate a plurality of triplets of 2D images of at least portions of the object's surface. Each triplet includes 3 views of essentially the same portion of the object's surface.

The plurality of triplets typically covers the entire area of interest, with overlap between adjacent triplets. For example, if the entire surface of the object is of interest, the triplets typically cover the entire surface, with overlap.

To generate each triplet of images for stages 610 and 620, a mobile triplet of conventional cameras with a fixed mutual orientation may be employed, such as three digital cameras with "pix" output fixedly mounted on a base such that the three cameras image essentially the same area. The same mutual orientation of cameras is used for imaging the scaling object or objects and for imaging the object of interest. The mobility of the camera triplet may even be provided by a human operator who moves around the object carrying the base and cameras with him and repeatedly images the object such that a sequence of overlapping portions of the object are imaged. If the object is not optically textured, optical texturing is artificially provided, e.g. by manually speckling the object. The human operator monitors his own movements and manually records which of the triplets overlap.

The "pix" file format output used in one embodiment of the invention is described in below.

Alternatively, the image triplets for steps (a) and (b) may be provided by using the imaging apparatus shown and described herein, including the optical texturing subsystem if the object is not optically textured.

In step (f), the fixed mutual orientation of the cameras is the same as the mutual orientation of the cameras used in scaling step (a). The focal length and aperture of each camera used in step (f) is the same as the focal length and aperture of the same camera used in step (a).

Alternatively, in stage 620 and all subsequent stages, the triplets of 2D images may be replaced by pairs of 2D images each including only 2 views of the same portion of the object's surface.

Stage 630: Local 3D Surface Structure Reconstruction

Local reconstruction—For each image triplet, i.e. for each three images of a particular portion of the object of interest, reconstruct the 3D surface structure of that object portion.

Figure 17:
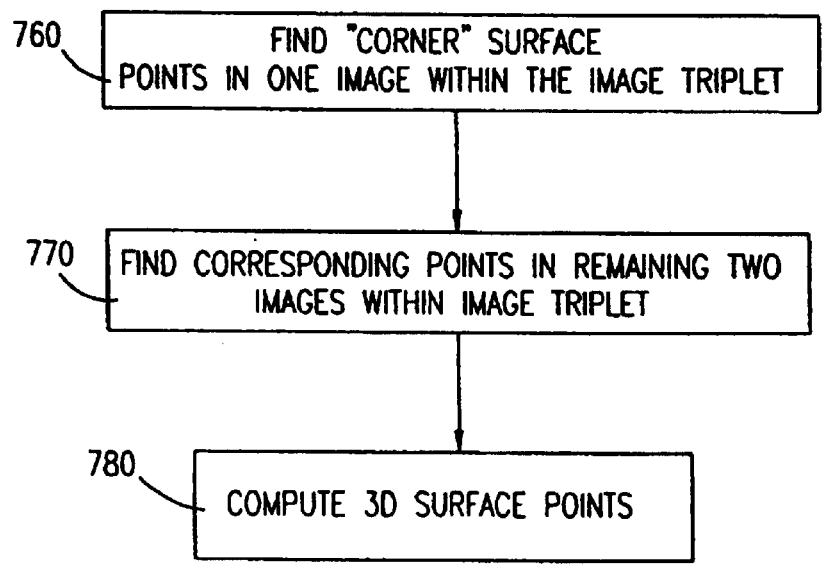
FIG. 17 is a simplified flowchart of a preferred method for local reconstruction.

As shown in FIG. 17, stage 630 includes performing the following steps for each image triplet:

g. Step 760: Find "corner" surface points in one image within the image triplet h. Step 770: Find corresponding points in remaining two images within image triplet i. step 780: Compute 3D surface points by projective reconstruction j. Step 790: Mapping of 3D surface points to Euclidean coordinates The above four steps are now described, for a single image triplet:

g. Step 760: Find "corner" surface points in one image within the image triplet—

A corner point, also termed herein a "good point", is a surface location at which there is a gradient change along more than one of the three dimensions of the surface.

A preferred method for performing step 760 "Finding good points" is described below.

h. Step 770: Find corresponding points in remaining two images within image triplet—A preferred method for performing this step is described below, "Description of Correspondence". The method includes building a pyramid which is used to smooth and decimate each of the images. A simulation of the results of applying the pyramid building process to an image illustrated in FIG. 12A, thereby to generate a 5-level pyramid is shown in FIGS. 12B–12F which are illustrations of the first to fifth levels of the pyramid.

Preferred methods for performing steps (i) and () are described in Israel Patent Application No. 113496 and in copending U.S. patent applications Ser. Nos. 08/497,224 and 08/787,345 and U.S. Pat. No. 5,598,515.

The output of step (j) is a set of 3D surface points represented in Euclidean coordinates.

Optionally, the 3D surface points generated by the above method are analyzed in order to weed out outlying 3D surface points as described below, "Methods for removing measurement noise".

Figure 18:
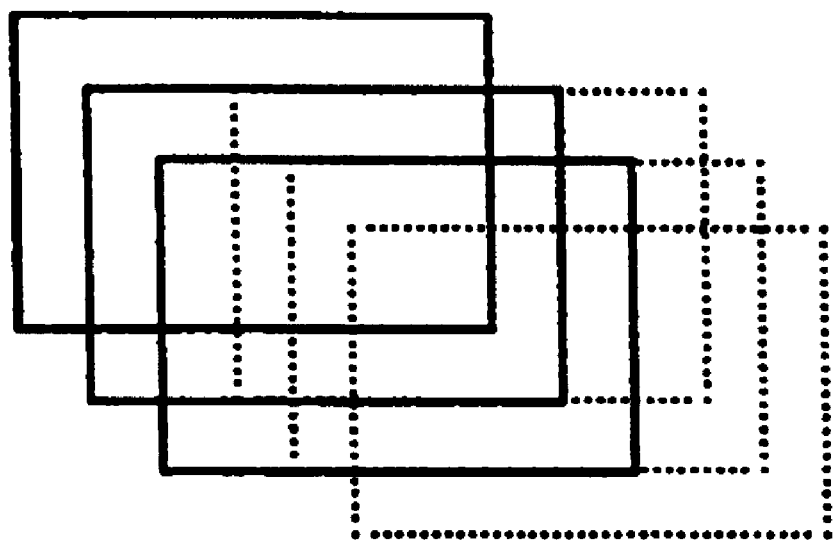
FIG. 18 is an illustration of a pair of partially overlapping patches.

Stage 640: Stitching Reconstructed Local 3D Surface Structures Into a Total Actual Surface Structure for the Object of Interest The input to the stitching process is Outputs 2 and 3 from the path planning module. A method for performing the stitching process for a pair of partially overlapping patches illustrated in FIG. 18 is described in detail below, "2D Stitching".

Generally, the stitching process comprises the following two steps:

Step j—For each pair of images specified in Output 2, compute a rotational and translational 3D transformation between the first and second surface portions reconstructed from the first and second image triplets, respectively, in the pair.

Step k—Aligning the reconstructed surface portions to form a single surface by operating the transformations computed in step (j) on their respective surface portions.

Step (j) preferably relies on external input identifying the approximate spatial relationship between the portions of the object imaged in each of the image triplets. This input may be provided by path planning module 80 of FIG. 1 and/or may comprise information regarding the actual movements of robot 10, which information is generated by the robot's encoders and/or may comprise information generated by a human operator who identifies geographical relationships by identifying features which occur in images of overlapping adjacent object portions. Alternatively, no external input regarding spatial relationships is provided.

Step k—As described above, step k comprises aligning the reconstructed surface portions to form a single surface by operating the transformations computed in step () on their respective surface portions.

Stage 650: Comparing Actual Surface Structure of Object of Interest to Desired Surface Structure 1. Aligning actual surface structure to desired surface structure—The coordinate transform for this process is preferably generated by imaging at least three preferably spherical alignment objects (not shown) which are preferably connected to a base (not shown) on which the object of interest 20 (FIG. 1) is seated and whose 3D locations relative to a CAD model of the object are known. If the alignment objects are spheres, their locations are determined by the locations of their centers. These alignment objects are reconstructed, using the methods described in U.S. patent application Ser. No. 08/497,224 and "stitched" to the remainder of the object. The transformation between the coordinate system of the sphere reconstruction and between the coordinate system of the CAD model is computed, using known methods such as that described on page 582 of Matrix Computations, 2nd Edition, Gene H. Colub and Charles F. Van Loan, John Hopkins University Press (1989). This transformation serves to align the actual and desired surface structures.

m. Identifying deviations between actual and desired surface structures—Preferably, this step is performed as follows: For each reconstructed point of the object, find the closest or almost closest patch in the CAD model and by an iterative Newton-Raphson procedure find a "closest point", i.e. a point on the patch which is closest or almost closest to the current reconstructed point. Compute the distance between the closest point and the reconstructed point. Preferably, the deviations found are displayed by color coding, e.g. use of different colors to represent distances within different ranges.

It is appreciated that stage 650 is only one possible application for the output of stages 610–640. Alternatively, for example, the output of stages 610–640 may be employed for reverse engineering.

It is appreciated that the software components of the present invention may, if desired, be implemented in ROM (read-only memory) form. The software components may, generally, be implemented in hardware, if desired, using conventional techniques.

The operation of the present invention will now be explained generally with reference to FIGS. 4–14C.

Figure 4:
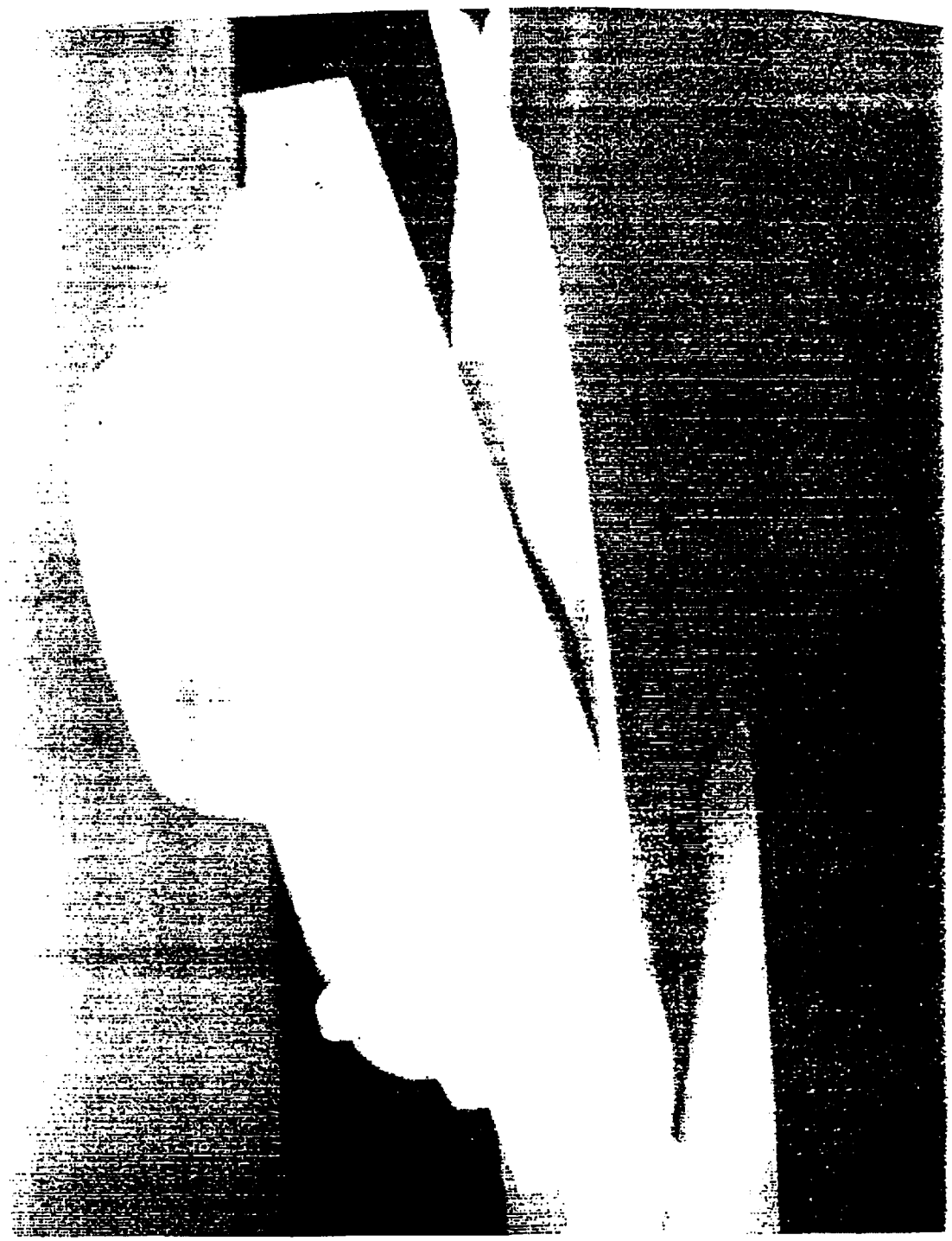
FIG. 4 illustrates a typical 3-dimensional object which can be imaged using the system of FIG. 1.
Figure 5:
FIG. 5 illustrates the 3-dimensional object of FIG. 4 having speckles projected on the surfaces thereof in accordance with a preferred embodiment of the present invention.

FIG. 4 illustrates a typical 3-dimensional object which can be imaged using the system of FIG. 1. In this case, the three dimensional object is a scale model of an automobile and is sufficiently small such that it can be viewed in its entirety at one time by the optic head 30. FIG. 5 illustrates the 3-dimensional object of FIG. 4 having speckles projected on the surfaces thereof in accordance with a preferred embodiment of the present invention.

Figure 6:
FIG. 6 illustrates a cloud of points produced by the system of FIGS. 1 which corresponds to the 3-dimensional object of FIGS. 4 and 5.

The system of the present invention is operative to generate a cloud of points which corresponds to the 3-dimensional object of FIGS. 4 and 5. This cloud of points is illustrated in FIG. 6. This cloud of points is a three-dimensional representation of the object of FIGS. 4 and 5.

Figure 8:
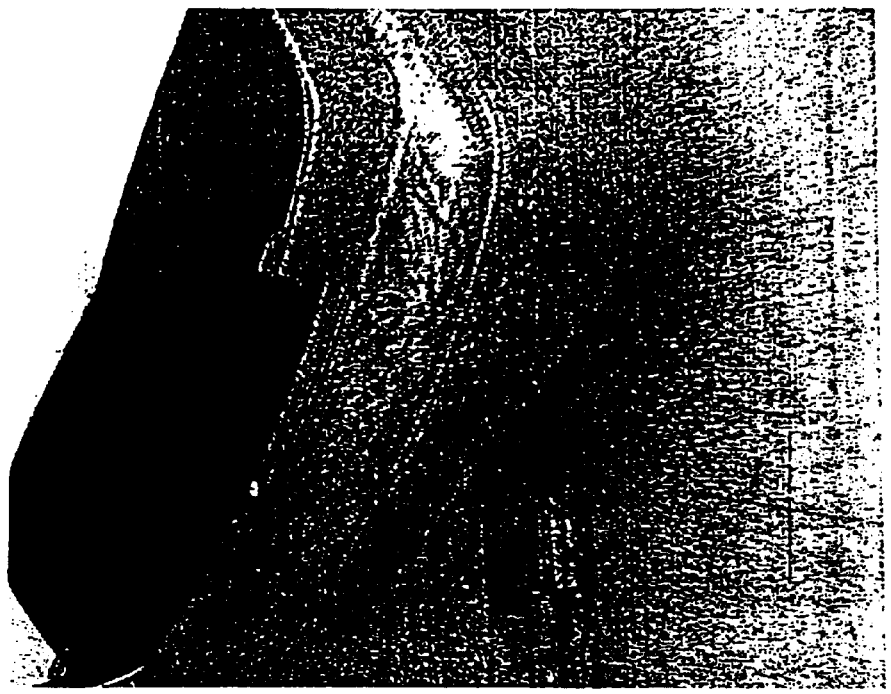
FIG. 8 illustrates the 3-dimensional object of FIG. 7 having painted on texture on the surfaces thereof in accordance with a preferred embodiment of the present invention.
Figure 7:
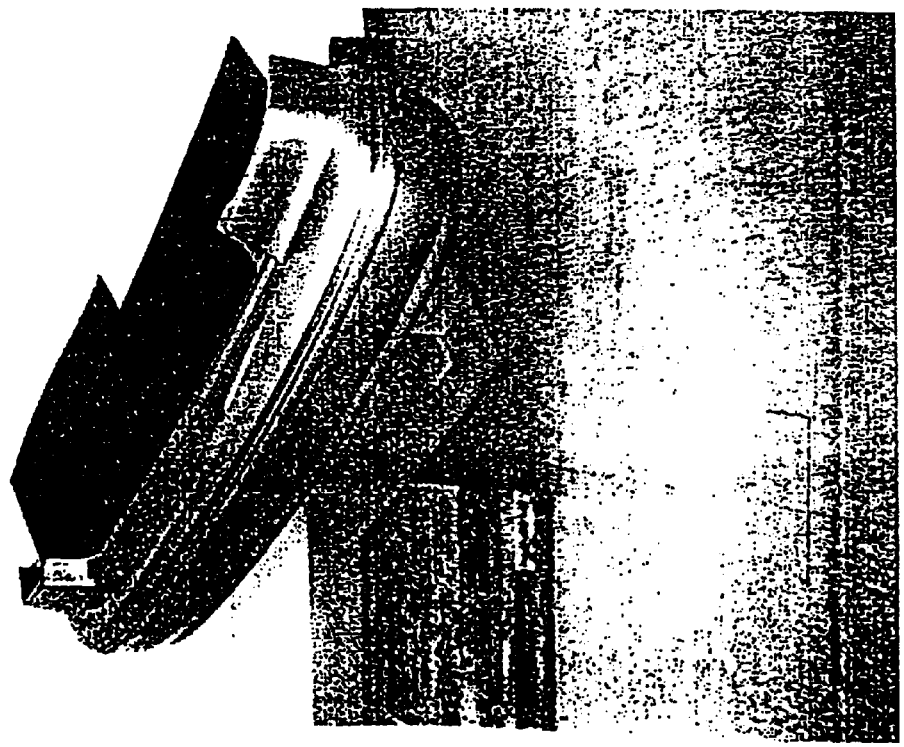
FIG. 7 illustrates another typical 3-dimensional object which can be imaged using the system of FIG. 1.

FIG. 7 illustrates another typical 3-dimensional object which can be imaged using the system of FIG. 1. This 3-dimensional object is, for example, a vehicle bumper and is too large to be viewed in its entirety by the optic head 30. FIG. 8 illustrates the 3-dimensional object of FIG. 7 having painted on texture on the surfaces thereof in accordance with a preferred embodiment of the present invention. This painted-on texture is presented as a simulation of the projected speckle texture pattern provided in accordance with a preferred embodiment of the present invention.

Figure 9:
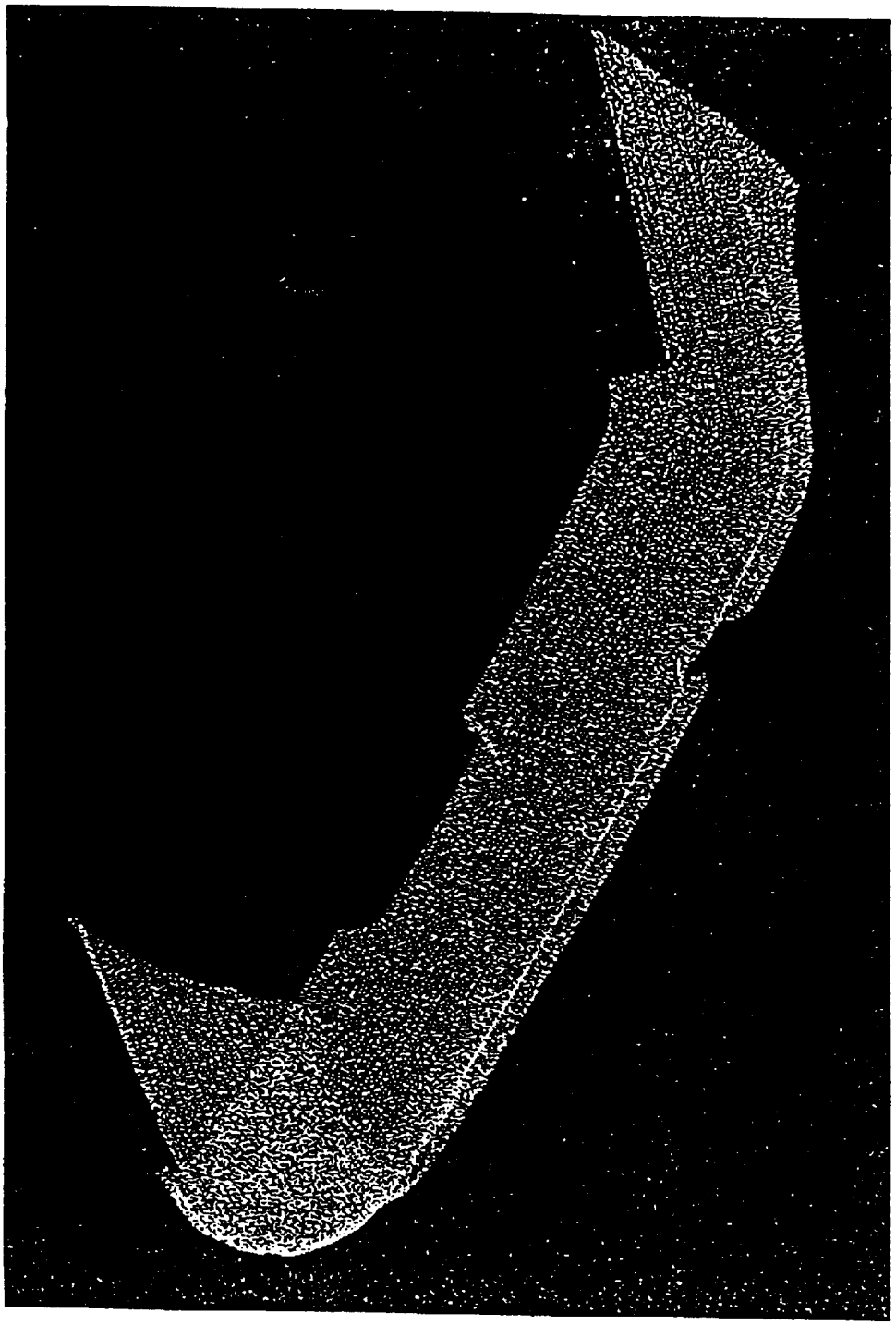
FIG. 9 illustrates a cloud of points produced by the system of FIG. 1 which corresponds to the 3-dimensional object of FIGS. 7 and 8.

FIG. 9 illustrates a cloud of points produced by the system of FIGS. 1 which corresponds to the 3-dimensional object of FIGS. 7 and 8.

In accordance with a preferred embodiment of the present invention, the system of FIG. 1 is operative to compare the cloud of points of FIG. 9 with a corresponding CAD file for the same object. Typical CAD models of the object of FIG. 7 appear in FIGS. 10A (wire frame) and 10B (solid model) and represent the CAD file for that object.

Figure 10A:
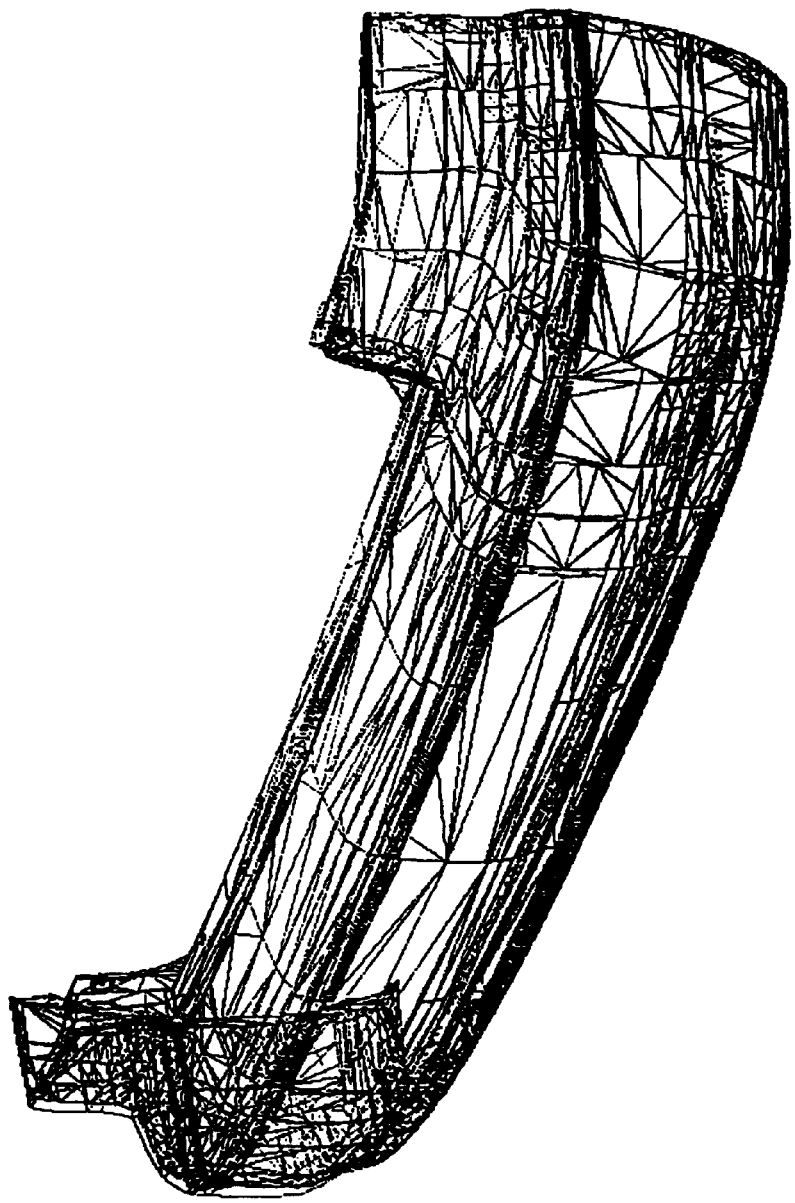
FIGS. 10A–10B illustrate a CAD model of the object of FIG. 7.
Figure 10B:
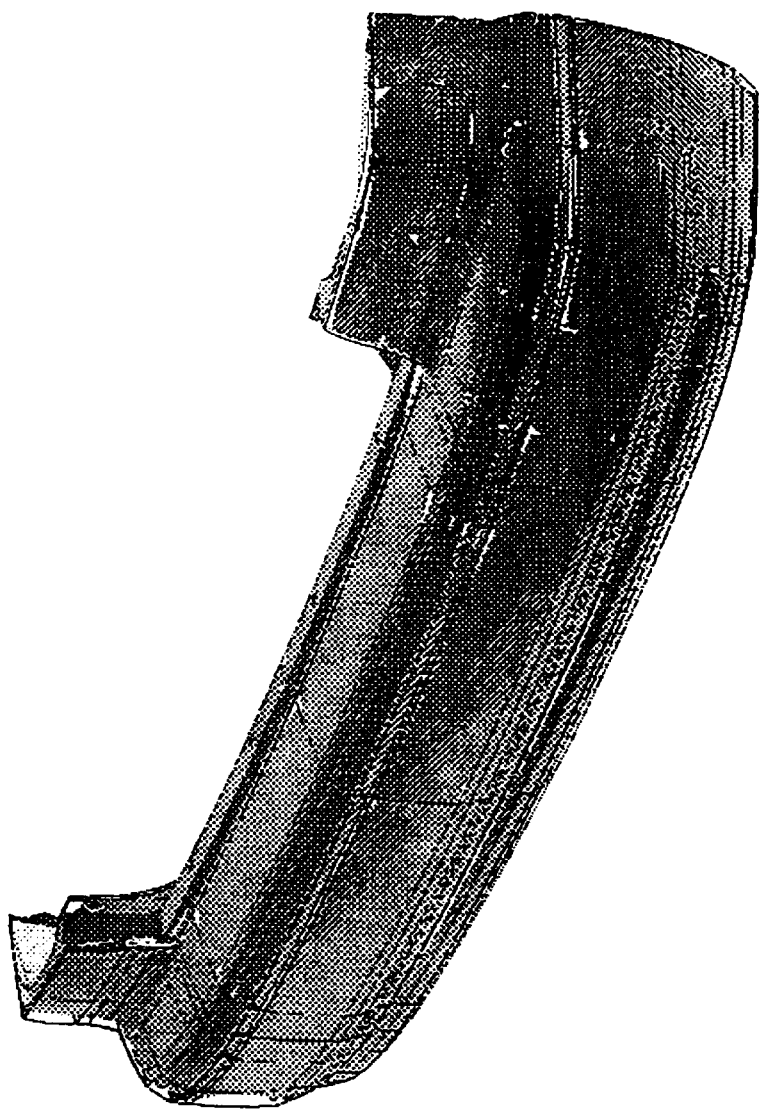
Figure 11:
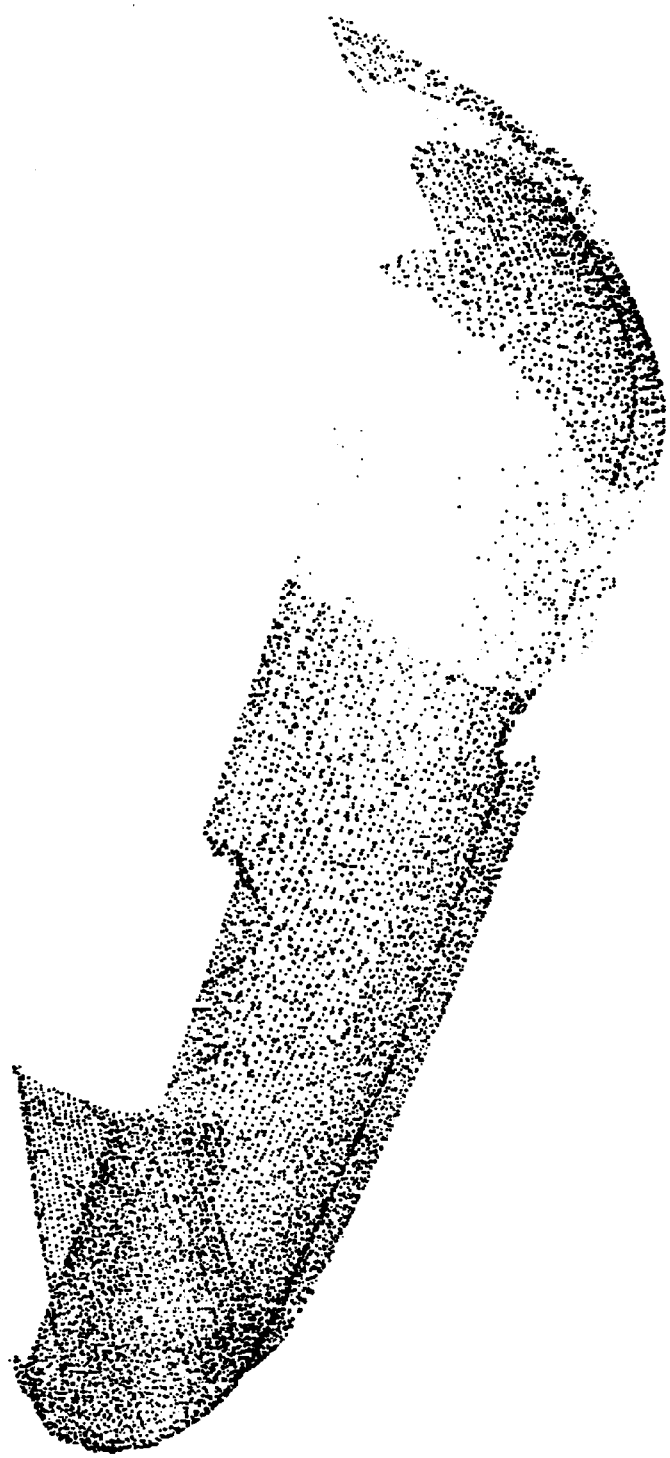
FIG. 11 is an illustration of the deviations between a three dimensional representation of the object of FIG. 7 and the CAD model thereof of FIG. 11.

FIG. 11 is an illustration of the deviations between a three dimensional representation of the object of FIG. 7 and the CAD models thereof of FIGS. 10A–10B.

FIGS. 12A–12F are simulations of the pyramid building process which forms part of the corresponding point finding process of step 770.

Figure 13A:
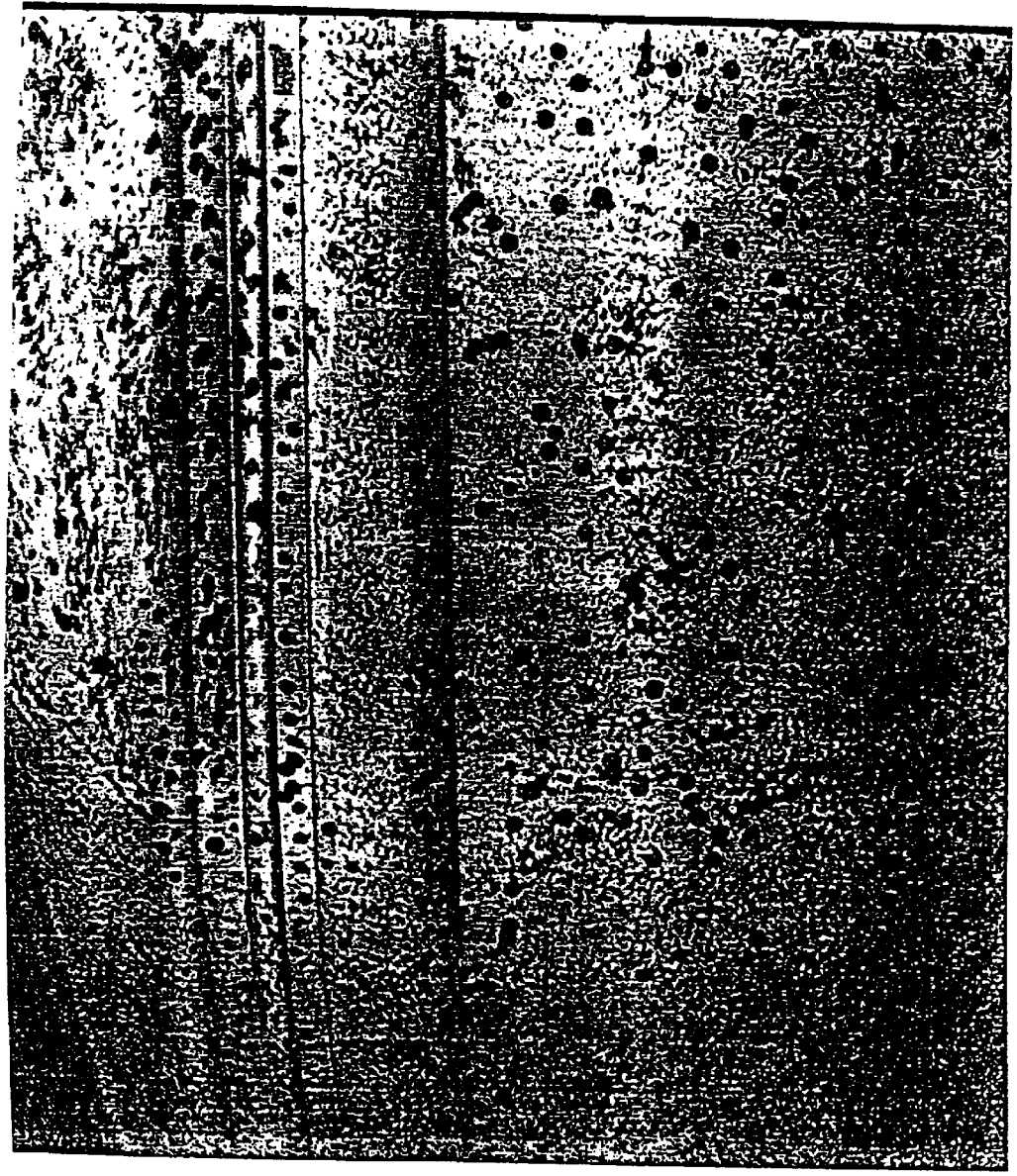
FIGS. 13A and 13B are two partially overlapping images of neighboring areas on the object of FIG. 7 having the texture of FIG. 8.
Figure 13B:
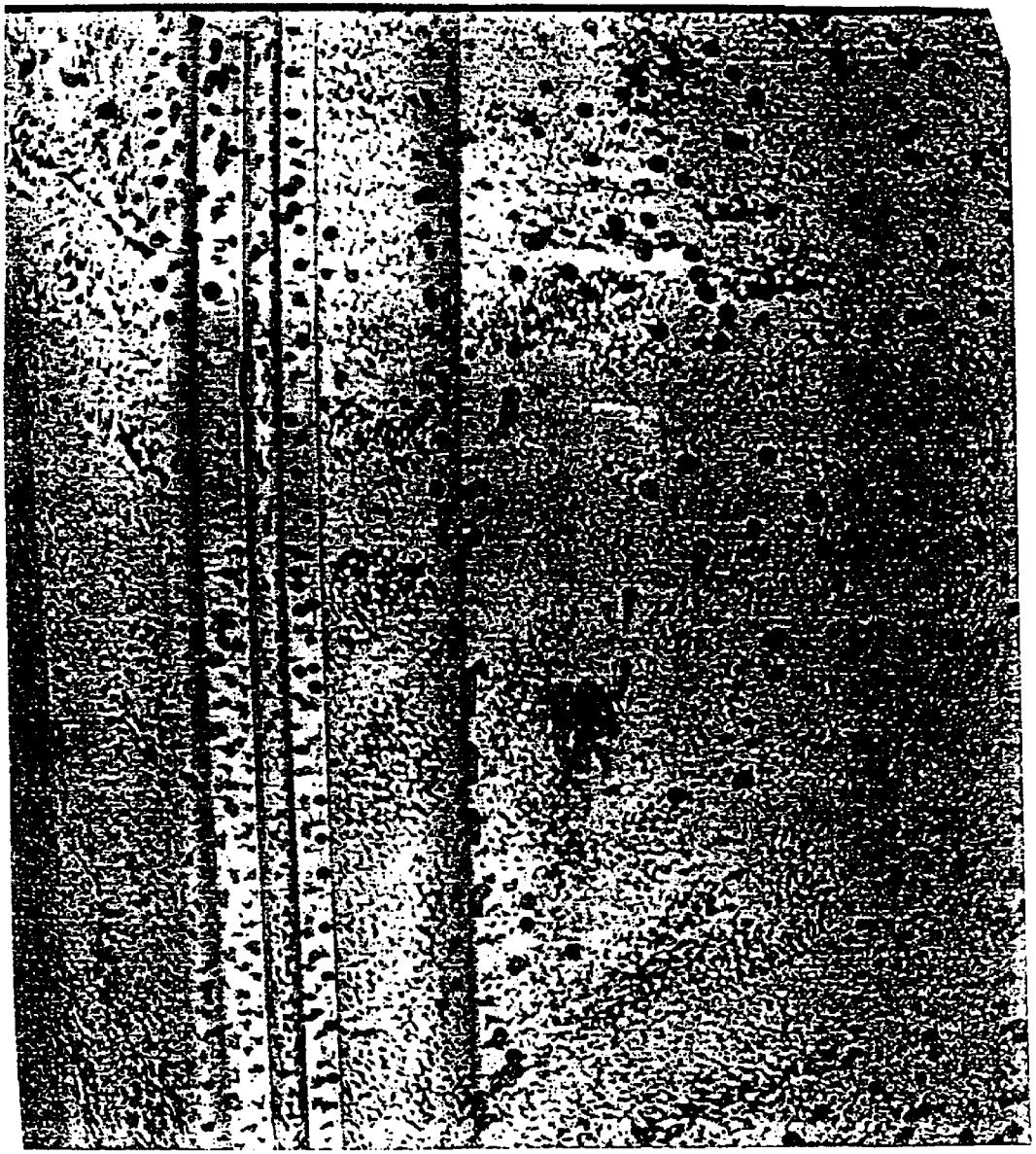

FIGS. 13A and 13B are two partially overlapping images of neighboring areas on the object of FIG. 7 having the texture of FIG. 8.

Figures 12A, 12B, 12C:
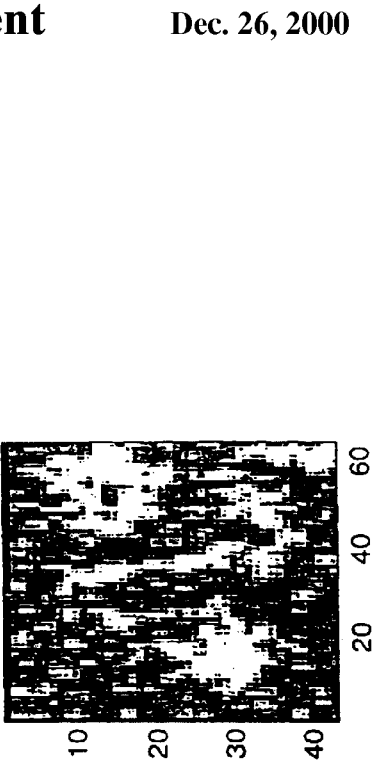
FIGS. 12A–12F are simulations of the pyramid correspondence method.
Figures 12D, 12E, 12F:
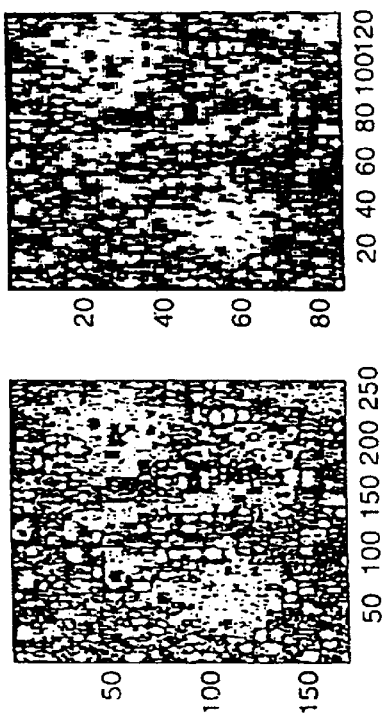
Figure 14A:
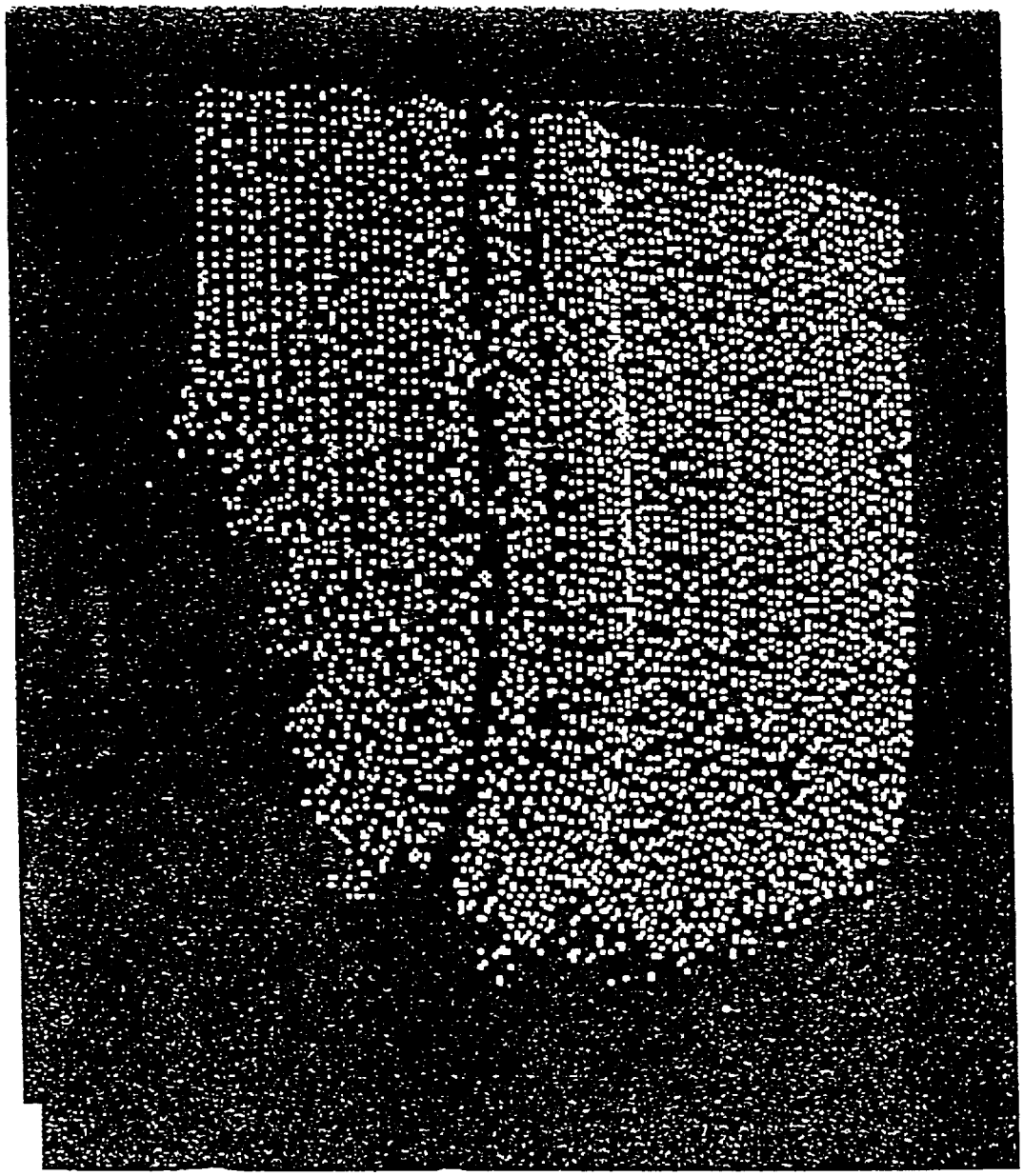
FIGS. 14A and 14B are portions of the clouds of points produced by the system of the present invention corresponding to the images of FIGS. 12A and 12B.
Figure 14B:
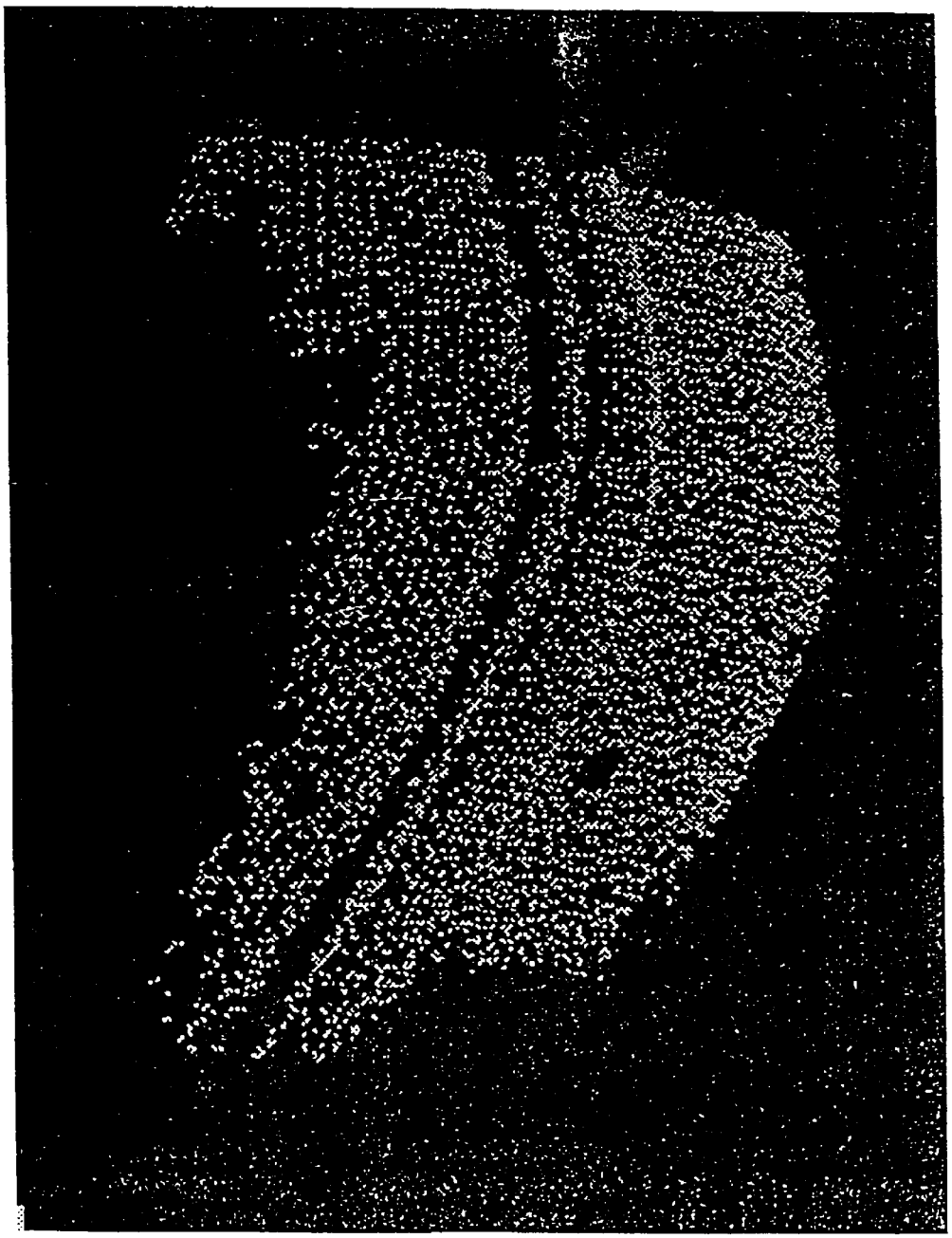

FIGS. 14A and 14B are portions of the clouds of points produced by the system of the present invention corresponding to the images of FIGS. 12A and 12B.

Figure 14C:
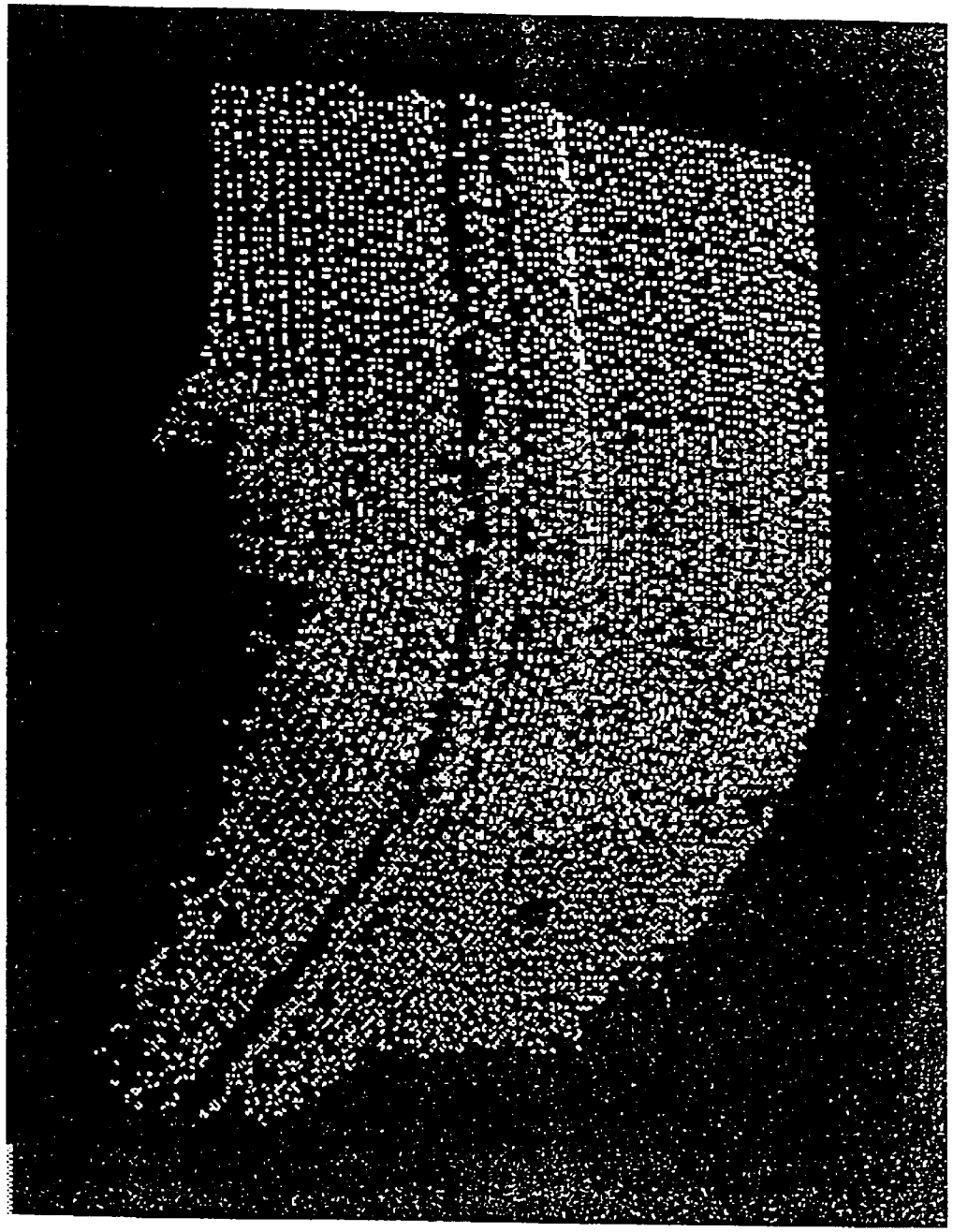
FIG. 14C is a combination of two combined clouds of points representing a "stitched" representation of the images of FIGS. 12A and 12B.

FIG. 14C is a combination of two combined clouds of points representing a "stitched" representation of the images of FIGS. 12A and 12B.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

Description of Correspondence

The problem: Given two images of a 3D object, find a pixel-to-pixel correspondence (matching) between the two images.

The Solution: A differential method is used based on the first order Taylor expansion of the Sum of Squares Difference (SSD) of a local moving 5-by-5 region implemented coarse-to-fine (hierarchically). Let $f(x,y)$ and $g(x,y)$ denote the two images and let $f_x(x,y)$ and $f_y(x,y)$ denote the components of the gradient of f at x,y. If u,v is the optimal translation such that $E(f(x+u,y+v)-g(x,y))^2$ is minimized over x,y in an overlapping small region (for example, a 5-by-5 window), then the differential equation $$uf_x+vf_y+(f-g)=0 \qquad (1)$$

should hold at every location x,y. Equation (1) can be minimized with respect to u,v by calculating $a=Ef_x^2$, $b=Ef_y^2$, $c=Ef_xf_y$, $d=Ef_rf_x$ and $e=Ef_rf_y$, where $f_r=f-g$. The u,v in equation (1) is the solution of the linear system of equations Mz=t, where "M" is the matrix $$\begin{bmatrix} a & c \\ d & e \end{bmatrix},$$

"z" is the vector $$\begin{bmatrix} u \\ v \end{bmatrix},$$

and "t" is the vector $$\begin{bmatrix} -d \\ -e \end{bmatrix}.$$

The optimization of u,v is applied at every pixel using a surrounding k-by-k window (where "k" preferably corresponds to five, but other values may be used). Once u,v are found at every x,y location, that is, once we obtain a displacement field u(x,y) and v(x,y), then images f and g are aligned ("warped") using the displacement field, and the process is repeated (thereby performing a Newton-Raphson iterative optimization that will find, u,v that optimize the SSD between f and g).

For better performance, especially along large image displacements, the iterations are applied coarse-to-fine. This can be done by dividing each image into a sequence of images each representing a frequency range (from low to high). In that case, the size of the k-by-k window will increase with low frequencies and decrease with high frequencies. Equivalently, the image can be smoothed and decimated creating an inverted pyramid. The lower levels of the pyramid represent high-frequency components and the higher levels (the smaller images) represent low-frequency components. The iterations start at the highest level of the pyramid (the coarsest representation of the image) producing an optimal displacement field for that level of detail. The displacement field is then amplified and applied to one level lower in the pyramid (representing a level with more details) and the iterations proceed to produce again the optimal displacement field for that level. This process continues until the lowest level of the pyramid is reached.

Description of Far-Correspondence

The Problem: Generate two images of a 3D object, find the amount of overlap in the image space, that is, find the magnitude of horizontal and vertical translation u,v that align the overlapping image information between the two images.

The Solution: A differential method is used based on the first order Taylor expansion of the Sum of Squares Difference (SSD) of the two images. Let f(x,y) and g(x,y) denote the two images and let $f_x(x,y)$ and $f_y(x,y)$ denote the components of the gradient of f at x,y. If u,v is the optimal translation such that $E(f(x+u,y+v)-g(x,y))^2$ is minimized over x,y in an overlapping region, then the differential equation $$uf_x+vf_y+(f-g)=0 \qquad (2)$$

should hold at every location x,y. Equation (2) can be minimized with respect to u,v by calculating $a=Ef_x^2$, $b=Ef_y^2$, $c=Ef_xf_y$, $d=Ef_rf_x$ and $e=Ef_rf_y$, where $f_r=f-g$. The u,v in equation (2) is the solution of the linear system of equations Mz=t, where "M" is the matrix $$\begin{bmatrix} a & c \\ d & e \end{bmatrix},$$

"z" is the vector $$\begin{bmatrix} u \\ v \end{bmatrix},$$

and "t" is the vector $$\begin{bmatrix} -d \\ -e \end{bmatrix}.$$

By iterating this optimization criterion we perform a Newton-Raphson iterative optimization that will find u,v that optimize the SSD between f and g.

Finding Good Points

The problem: Given an image, find the positions (x,y locations) of points which are likely to have good matches in other images, that is, points whose local intensity distribution resembles a "corner."

The Solution: It is preferable to eliminate points whose local intensity variance is very low (a flat intensity profile) or whose local variance is shaped as a straight line. Let f(x,y) denote the intensity map of the image and let $f_x(x,y)$ and $f_y(x,y)$ denote the components of the gradient of f at x,y. If a two-by-two matrix M is defined for point x,y having components $M_{11}=Ef_x^2$, $M_{12}=M_{21}=Ef_{xy}$, and $M_{22}=Ef_y^2$, where the summations are over a local region around the point, the rank of matrix M has the value two if and only if the point is a "good point." The rank-2 criterion is implemented by considering the relative magnitude of the two eigenvalues of matrix M. If the ratio of the eigenvalues is close to unity and the value of the smaller eigenvalue is above a predetermined threshold value, which may be set by an operator, then the point is considered "good." This criteria is preferably implemented for all points x,y of f, and only those points that satisfied the criteria are considered good points.

Two-dimensional Stitching

The problem: Assume that there are two sets of images. A first set of images, namely, images $A_0$, $A_1$ and $A_2$, correspond to a patch A of a scene, and a second set of images, namely, images $B_0$, $B_1$ and $B_2$, correspond to patch B of a scene. Assume further that patches A and B overlap in the scene, at least to some extent. If both sets of images were taken by the same configuration of cameras, then the same trilinear tensor can be applied to these images in the reconstruction process to obtain 3D reconstructed points in the scene (reference the aforementioned Israeli Patent Application No. 113496 and U.S. patent application Ser. No. 08/497,224 (whose disclosure corresponds to International Publication No. WO 96/34365, published Oct. 31, 1996)). Namely, if the $\{p_i, p'_i, p''_i\}_i$ are corresponding points in the first set of images $A_0$, $A_1$ and $A_2$, respectively, and if $\{q_j, q'_j, q''_j\}_j$ are corresponding points in the second set of images $B_0$, $B_1$ and $B_2$, respectively, then the same trilinear tensor can be used on any triple $\{p_i, p'_i, p''_i\}_i$ to obtain a 3D reconstructed point $P_i$ in the scene as well as on any triple $\{q_j, q'_j, q''_j\}_j$ to obtain a 3D reconstructed point $Q_j$ in the scene. The objective is to align the 3D reconstructed points $\{P_i\}_i$ to the 3D reconstructed points $\{Q_j\}_j$ using the images $A_0, A_1, A_2, B_0, B_1$ and $B_2$.

The solution: The first step is to determine the dense correspondence between the first image $A_0$ of the first set and the first image $B_0$ of the second set. In particular, for any point $p_i$ which is a point in image $A_0$ which appears in the intersection of the patches A and B, we have the corresponding pair $\{p_i, q_i\}$. A preferred method for performing this first step includes the steps of:

(a) Finding a dominant translation using the "Description of Far Correspondence" methodology described above; and (b) Finding the remaining displacement using the "Description of Correspondence" methodology described above.

After $q_i$ has been found, $q'_i$ and $q''_i$ in images $B_1$ and $B_2$ are found by using the "Description of Correspondence" methodology described above. If point $p_i$ in image $A_0$ corresponds to point $P_i$ in patch A, then the triplet $\{q_i, q'_i, q''_i)$ corresponds to the same point $P_i$.

Thereafter, the trilinear tensor is applied to reconstruct the 3D point $Q_i$. Note that unlike the initial situation, in which there were two independent sets of 3D points, there are currently two sets of 3D points which actually represent the same set of 3D points in two different coordinate systems, namely, a first coordinate system associated with the configuration of cameras that was used to record the first set of images $A_0, A_1$ and $A_2$ and a second coordinate system associated with the configuration of cameras that was used to record the second set of images $B_0, B_1$ and $B_2$, and it is desired to obtain a transformation to associate the first coordinate system to the second coordinate system. In particular, given two sets of 3D points $\{P_i\}_i$ and $\{Q_j\}_j$, a transformation comprising a rotation "R" and a translation "t" are generated which minimizes $E_i\|RP_i+t-Q_i\|^2$. In that operation, the translation "t" can be eliminated since, after finding the rotation "R," it is evident that the appropriate translation is simply Q'-RP', where P' is the average over the points $\{P_i\}_i$ and Q' is the average over the points $\{Q_j\}_j$. It will be appreciated that, after the averages P' and Q' are generated, and if new sets of points $\{P_i-P'\}_i$ and $\{Q_j-Q'\}_j$ are introduced, the center of each of these sets is the origin, and hence the best transformation for mapping one set to the other involve merely a rotation. Known algorithms may be used to generate the rotation R between the sets $\{P_i-P'\}_i$ and $\{Q_j-Q'\}_j$, see, for example, Gene H. Golub and Charles F. Van Loan, "Matrix Computations" (2d ed) (Johns Hopkins University Press, 1989), page 582.

Methods for Removing Measurement Noise

The problem: Given a list or set of matching pairs of between two images, remove the outliers.

The solutions: There are several illustrative methodologies:

1. 3D smoothness assumption: Use the matching points and reconstruct the 3D coordinates of the corresponding 3D points. If it is assumed that the surface shape is smooth, with low curvature, for every point P a second order surface approximation of the points in a neighboring local region is calculated. If the distance of a point P from the local quadratic patch is above a predetermined threshold value, the P is an outlier.

2. Photometric properties: Consider each presumably matching pair p,q in the two images. If, by running the correspondence process, p "considers" q its matching pair, and, by running the correspondence process in reverse, q also "considers" p its matching pair, then p,q are not considered outliers. However, if, by running the correspondence process, p "considers" q its matching pair, but by running the correspondence process in reverse, q does not "considers" p its matching pair, then p,q are considered outliers.

Other methodologies may also be used.

Description of "pix" file format

The following data structure describes the format of pix image files in the syntax of the "C" programming language:

```
typedef structure {
ctImage_PIX_TYPE type;   /*type of image pixels*/
int       width;    /*width of image*/
int       height;   /*height of image*/
int       border;   /*size of image border*/
int       depth;    /*number of pixel maps*/
void      **pixmap_arr[ctImage_MAX_DEPTH];
          /*Pointers to images always point to the beginning of the
          image, not to the all block containing the border. Access to
          pixmaps elements img->pixmap_arr[d][i][j] where d is
          the depth level, -border≦i<width+border,
          -border≦j<height+border are pixel coordinates*/
}
Typedef enum {
          ctImage_PIX_TYPE_SAME=0
          ctImage_PIX_TYPE_UBYTE=2
          ctImage_PIX_TYPE_SHORT=3
          ctImage_PIX_TYPE_LONG=5
          ctImage_PIX_TYPE_FLOAT=6
          ctImage_PIX_TYPE_DOUBLE=7
          ctImage_PIX_TYPE_ENUM_END
} ctImage_PIX_TYPE
```

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A 3D surface geometry reconstruction system for reconstructing the surface geometry of an object to a given degree of precision, the system comprising:

a three-view optic head operative to generate at least three views of at least a portion of the object;

a mechanical manipulator operative to vary the relative orientation of the object and the optic head, at a precision less than said given degree of precision, from a first relative orientation in which a first portion of the object is visible to at least one second relative orientation in which a second portion of the object, which overlaps said first portion, is visible;

a local 3D surface geometry reconstruction unit operative to reconstruct the surface geometry of said first and second portions of the object, based on at least two of three views of said first and second portions generated by said optic head; and a surface geometry stitching unit operative to determine the relative locations of said first and second portions of the objects.

2. A system according to claim 1 wherein said mechanical manipulator comprises an object manipulator operative to move the object.

3. A system according to claim 1 wherein said mechanical manipulator comprises an optic head manipulator operative to move the optic head.

4. A system according to claim 1 wherein said three views generated by said optic head include two views on which 3D surface geometry reconstruction is based and a third view from which a tensor is computed which represents the internal orientation of each of said three views and the relative orientation of the three views.

5. A system according to any of the preceding claims wherein said object includes:

a first section of the object seen in one of said three views;

a second section of the object seen in another of said three views; and an overlap section of the object which is included in said first section and said second section; and wherein said 3D surface geometry reconstruction unit comprises an overlap texture analyzer operative to analyze texture of a section of said second portion which overlaps said first portion thereby to determine the relative locations of said first and second portions.

6. A system according to claim 5 wherein said texture comprises surface texture of the object.

7. A system according to claim 5 wherein said texture comprises a texture applied to the object.

8. A system according to claim 7 wherein said texture is projected onto said object.

9. A system according to claim 8 comprising a plurality of speckle generators each projecting a random speckle pattern onto the object.

10. A system according to claim 9 wherein each of said speckle generators comprises a diffuser on which a speckle pattern is generated and through which light is projected to project the speckle pattern from the diffuser onto a portion of said object.

11. A system according to claim 10 wherein each of said speckle generators comprise a laser diode which directs laser light via a lens onto said diffuser.

12. A system according to claim 10 wherein said diffuser is a holographic diffuser.

13. A system according to claim 8 wherein said texture is a speckle pattern projected onto said object.

14. A system according to claim 13 comprising a plurality of speckle generators each projecting a random speckle pattern onto the object.

15. A system according to claim 14 wherein each of said speckle generators comprises a diffuser on which a speckle pattern is generated and through which light is projected to project the speckle pattern from the diffuser onto a portion of said object.

16. A system according to claim 15 wherein each of said speckle generators comprise a laser diode which directs laser light via a lens onto said diffuser.

17. A system according to claim 15 wherein said diffuser is a holographic diffuser.

18. A system according to claim 5 wherein said texture does not vary as a result of variation in the relative orientation of the object and the optic head.

19. A system according to claim 1 wherein the mechanical manipulator provides a plurality of relative orientations of the object and the optical head such that the entire surface of the object is imaged by the optical head and wherein said surface geometry stitching unit is operative to reconstruct the entire surface of the object.

* * * * *